(12) United States Patent
Cheng

(10) Patent No.: US 10,911,201 B2
(45) Date of Patent: Feb. 2, 2021

(54) METHODS AND APPARATUSES FOR MULTI-TRP TRANSMISSION

(71) Applicant: FG Innovation Company Limited, Tuen Mun (HK)

(72) Inventor: Yu-Hsin Cheng, Hsinchu (TW)

(73) Assignee: FG Innovation Company Limited, Tuen Mun (HK)

(*) Notice: Subject to any disclaimer, the term of this patent is extended or adjusted under 35 U.S.C. 154(b) by 27 days.

(21) Appl. No.: 16/427,371

(22) Filed: May 31, 2019

(65) Prior Publication Data

US 2019/0379506 A1 Dec. 12, 2019

Related U.S. Application Data

(60) Provisional application No. 62/682,332, filed on Jun. 8, 2018.

(51) Int. Cl.
| | |
|---|---|
| H04L 5/00 | (2006.01) |
| H04W 72/04 | (2009.01) |
| H04W 76/27 | (2018.01) |
| H04W 88/06 | (2009.01) |
| H04L 1/00 | (2006.01) |
| H04W 80/02 | (2009.01) |

(52) U.S. Cl.
CPC .......... *H04L 5/0051* (2013.01); *H04L 1/0026* (2013.01); *H04L 1/0038* (2013.01); *H04W 72/042* (2013.01); *H04W 72/0413* (2013.01); *H04W 76/27* (2018.02); *H04W 80/02* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2014/0064109 A1* | 3/2014 | Krishnamurthy | .... H04J 11/0053 370/252 |
| 2017/0033912 A1* | 2/2017 | Onggosanusi | .... H04W 72/0413 |
| 2017/0332371 A1* | 11/2017 | Kubota | ................ H04B 7/0621 |

(Continued)

FOREIGN PATENT DOCUMENTS

| | | |
|---|---|---|
| WO | 2018082621 A1 | 5/2018 |
| WO | 2018083551 A1 | 5/2018 |

OTHER PUBLICATIONS

CATT Discussion on multi-beam operation for NR-PDCCH R1-1712394, 3GPP TSG RAN WG1 Meeting #90 Aug. 25, 2017 (Aug. 25, 2017) pp. 1-4.

(Continued)

*Primary Examiner* — Brian S Roberts
(74) *Attorney, Agent, or Firm* — ScienBiziP, P.C.

(57) ABSTRACT

A method performed by a User Equipment (UE) is provided. The method includes receiving Transmission/Reception Point (TRP) information from a Base Station (BS), and communicating with a plurality of TRPs based on the TRP information, where the TRP information identifies a correspondence between the plurality of TRPs and a plurality of Downlink (DL) Reference Signal (RS) resources, and where the TRP information includes at least one of a plurality of TRP Identifiers (IDs), a plurality of Control Resource Set (CORESET) IDs, or a TRP mapping table including a plurality of TRP indices and a plurality of DL RS resource indices.

20 Claims, 19 Drawing Sheets

(56) References Cited

U.S. PATENT DOCUMENTS

| | | | |
|---|---|---|---|
| 2018/0083688 A1* | 3/2018 | Agiwal | H04M 3/42229 |
| 2018/0091212 A1* | 3/2018 | Lee | H04B 7/0695 |
| 2019/0058517 A1* | 2/2019 | Kang | H04L 5/0048 |
| 2019/0182697 A1* | 6/2019 | Zhang | H04B 7/088 |
| 2019/0238208 A1* | 8/2019 | Tang | H04W 24/10 |
| 2019/0306881 A1* | 10/2019 | Fakoorian | H04L 5/0053 |

OTHER PUBLICATIONS

ERICSSON on Multi-beam and Multi-TRP Operation for PDCCH R1-1711481, 3GPP TSG RAN WG1 NR Ad-Hoc#2 Jun. 30, 2017 (Jun. 30, 2017) pp. 1-3.

* cited by examiner

```
                            ← 202

CSI-ReportConfig::{
   -resourcesForChannelMeasurement:
      -CSI-ResourceConfigID#1
   -CSIReportQuantity:
      -CRI/RI/PMI/CQI/LI
   -GroupBasedCSIReporting:
      -Ture

```
CSI-ResourceConfig::{
   -CSI-ResourceConfigID:
       -CSI-ResourceConfigID#1
   -csi-RS-ResourceSetList:
       -NZP-CSI-RS-Resourceset#2:
         -NZP-CSI-RS-Resource#0:
           -CSI-RS-ResourceMapping -NZP-CSI-RS-Resource#1:
           -CSI-RS-ResourceMapping -NZP-CSI-RS-Resource#2:
           -CSI-RS-ResourceMapping -NZP-CSI-RS-Resource#3:
           -CSI-RS-ResourceMapping

|  | QCL-RS#1 | QCL-RS#2 |
|---|---|---|
| Row1(TRP#1) | CSI-RS resource#0 | CSI-RS resource#1 |
| Row2(TRP#2) | CSI-RS resource#2 | CSI-RS resource#3 |

```
                            ┌─ 502
                            ▼
┌─────────────────────────────────────────┐
│  CSI-ReportConfig::{                    │
│     -resourcesForChannelMeasurement     │
│     -CSIReportQuantity                  │
│     -PUCCH-CSI-Resource:                │
│       -PUCCH resource#10                │
│                 ⋮                       │
│  }                                      │
└─────────────────────────────────────────┘
```

FIG. 5A

```
                          ┌─ 504
                          ▼
┌─────────────────────────────────────────────────────┐
│ PUCCH-Config::{                                     │
│    -PUCCH-ResourceSet#0:                            │
│    -PUCCH-ResourceSet#1:                            │
│    -PUCCH-ResourceSet#2:                            │
│       -PUCCH-Resource:                              │
│        -PUCCH-ResourceID:                           │
│          -PUCCH-ResourceID#10                       │
│    -spatialRelationInfo:                            │
│      -SSB#0,SSB#1,SSB#2,SSB#3,CRI#0,CRI#1,CRI#2,CRI#3 │
│                                                     │
│              ⋮                                      │
│                                                     │
│  }                                                  │
└─────────────────────────────────────────────────────┘
```

FIG. 5B

```
PDCCH-Config::{
  -controlResourceSet:
    -controlResourceSetID:
      -controlResourceSet#1
    -tci-StatesPDCCH:
      -TCI state#1
        -CRI#0
    -tci-PresentInDIC:
      -enable
      ⋮
  -controlResourceSet:
    -controlResourceSetID:
      -controlResourceSet#2
    -tci-StatesPDCCH:
      -TCI state#2
        -CRI#2
    -tci-PresentInDIC:
      -disable
      ⋮
}
```

```
PDCCH-Config::{
  -controlResourceSet:
    -controlResourceSetID:
      -controlResourceSet#1
    -tci-StatesPDCCH:
      -TCI state#1
        -CRI#0
    -tci-PresentInDIC:
      -enable
      ⋮
  -controlResourceSet:
    -controlResourceSetID:
      -controlResourceSet#2
    -tci-StatesPDCCH:
      -TCI state#2
        -CRI#2
    -tci-PresentInDIC:
      -disable
      ⋮
}
```

FIG. 8B

```
BeamFailureRecoveryConfig::{
  -candidateBeamRSList:
    -CRI#0
    -CRI#1
       ⋮
    -CRI#7
  -candidateBeamThreshold:
    --65 dBm
   ⋮
}
```

|  | QCL-RS#1 | QCL-RS#2 | QCL-RS#3 |
|---|---|---|---|
| Row1(TRP#1) | CSI-RS resource#0 | CSI-RS resource#1 | CSI-RS resource#2 |
| Row2(TRP#2) | CSI-RS resource#3 | CSI-RS resource#4 | CSI-RS resource#5 |
| Row3(TRP#3) | CSI-RS resource#6 | CSI-RS resource#7 |  |

```
PDCCH-Config::={
 -SearchSpace:
  -SearchSpaceID:
   -SearchSpace#6
  -nrofCandidates:
   -AL1:6
   -AL2:6
   -AL4:4
   -AL8:2
  -searchSpaceType:
   -UEspecific
  ...
  -SearchSpaceID:
   -SearchSpace#7
  -nrofCandidates:
   -AL4:4
   -AL8:2
  -searchSpaceType:
   -Common
  ...
 -controlResourceSetID:
  -controlResourceSet#3
  ...
}
```

```
1402
PDCCH-Config::={
 -SearchSpace:
  -SearchSpaceID:
   -SearchSpace#4
  -nrofCandidates:
   -AL1:6
   -AL2:6
   -AL4:4
   -AL8:2
  -searchSpaceType:
   -UEspecific
  ...
  -SearchSpaceID:
   -SearchSpace#5
  -nrofCandidates:
   -AL4:4
   -AL8:2
  -searchSpaceType:
   -Common
  ...
 -controlResourceSetID:
  -controlResourceSet#2
  ...
}
```

```
PDCCH-Config::={
 -controlResourceSet:
  -controlResourceSetID:
   -controlResourceSet#2
  -tci-StatesPDCCH:
   -TCI state#1
   -CRI#0
  ...
  -controlResourceSetID:
   -controlResourceSet#3
  -tci-StatesPDCCH:
   -TCI state#1
   -CRI#2
  ...
}
```

FIG. 14

| | Maximum number of PDCCH candidates per slot and per serving cell |
|---|---|
| 15KHz | 44 |
| 30KHz | 36 |
| 60KHz | 22 |
| 120KHz | 20 |

| | QCL-RS#1 | QCL-RS#2 |
|---|---|---|
| Row1(TRP#1) | CSI-RS resource#0 | CSI-RS resource#1 |
| Row2(TRP#2) | CSI-RS resource#2 | CSI-RS resource#3 |

METHODS AND APPARATUSES FOR MULTI-TRP TRANSMISSION

CROSS-REFERENCE TO RELATED APPLICATION(S)

The present application claims the benefit of and priority to a provisional U.S. Patent Application Ser. No. 62/682,332 filed on Jun. 8, 2018, entitled "Method and Apparatus for a Network with Multiple TRP Transmission," with Attorney Docket No. US73861 (hereinafter referred to as "US73861 application"). The disclosure of the US73861 application is hereby incorporated fully by reference into the present application.

FIELD

The present disclosure generally relates to wireless communications, and more particularly, to methods and apparatuses for multi-Transmission/Reception Point (TRP) transmission.

BACKGROUND

Various efforts have been made to improve different aspects of wireless communications, such as data rate, latency, reliability and mobility, for the next generation (e.g., 5G New Radio (NR)) wireless communication systems. Multi Input Multi Output (MIMO) is one of the key features in the next generation wireless communication systems. With MIMO technology, a large number of antenna elements bring extra degrees of freedom to increase the data throughput, the beamforming gain, and the coverage. MIMO technology may be applied on TRPs, so that beamforming at each TRP may be realized. Multi-TRP transmission is also a key feature in the next generation wireless communication systems. While utilizing multi-TRP transmission in the next generation wireless communication networks may be beneficial, adopting multi-TRP transmission in such networks still presents challenges.

Therefore, there is a need in the art for an improved mechanism for multi-TRP transmission.

SUMMARY

The present disclosure is directed to methods and apparatuses for multi-TRP transmission.

According to an aspect of the present disclosure, a method performed by a User Equipment (UE) is provided. The method includes receiving TRP information from a Base Station (BS), and communicating with a plurality of TRPs based on the TRP information, where the TRP information identifies a correspondence between the plurality of TRPs and a plurality of Downlink (DL) Reference Signal (RS) resources, and where the TRP information includes at least one of a plurality of TRP Identifiers (IDs), a plurality of Control Resource Set (CORESET) IDs, or a TRP mapping table including a plurality of TRP indices and a plurality of DL RS resource indices.

According to another aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to receive TRP information from a BS, and communicate with a plurality of TRPs based on the TRP information, where the TRP information identifies a correspondence between the plurality of TRPs and a plurality of DL RS resources, and where the TRP information includes at least one of a plurality of TRP IDs, a plurality of CORESET IDs, or a TRP mapping table including a plurality of TRP indices and a plurality of DL RS resource indices.

BRIEF DESCRIPTION OF THE DRAWINGS

Aspects of the present example disclosure are best understood from the following detailed description when read with the accompanying figures. Various features are not drawn to scale. Dimensions of various features may be arbitrarily increased or reduced for clarity of discussion.

FIG. 2A is a schematic diagram illustrating a Channel State Information (CSI) report configuration, in accordance with example implementations of the present disclosure.

FIG. 2B is a schematic diagram illustrating a CSI resource configuration, in accordance with example implementations of the present disclosure.

FIG. 3 is a schematic diagram illustrating a TRP mapping table contained in the TRP information, in accordance with example implementations of the present disclosure.

FIG. 5A is a schematic diagram illustrating a CSI report configuration, in accordance with example implementations of the present disclosure.

FIG. 5B is a schematic diagram illustrating a Physical Uplink Control Channel (PUCCH) configuration of a Radio Resource Control (RRC) configuration, in accordance with example implementations of the present disclosure.

FIG. 7B is a schematic diagram illustrating a Physical Downlink Control Channel (PDCCH) configuration, in accordance with example implementations of the present disclosure.

FIG. 8B is a schematic diagram illustrating a PDCCH configuration, in accordance with example implementations of the present disclosure.

FIG. 11 is a schematic diagram of a Beam Failure Recovery (BFR) configuration in an RRC configuration, in accordance with example implementations of the present disclosure.

FIG. 12 is a schematic diagram of a TRP mapping table included in the TRP information, in accordance with example implementations of the present disclosure.

FIG. 14 is a schematic diagram illustrating a PDCCH configuration of an RRC configuration, in accordance with example implementations of the present disclosure.

FIG. 15 is a schematic diagram illustrating the maximum number of PDCCH candidates per slot and per serving cell under different Sub-Carrier Spacing (SCS) values, in accordance with example implementations of the present disclosure.

FIG. 16 is a schematic diagram illustrating a TRP mapping table contained in the TRP information, in accordance with example implementations of the present disclosure.

DETAILED DESCRIPTION

Figure 1:
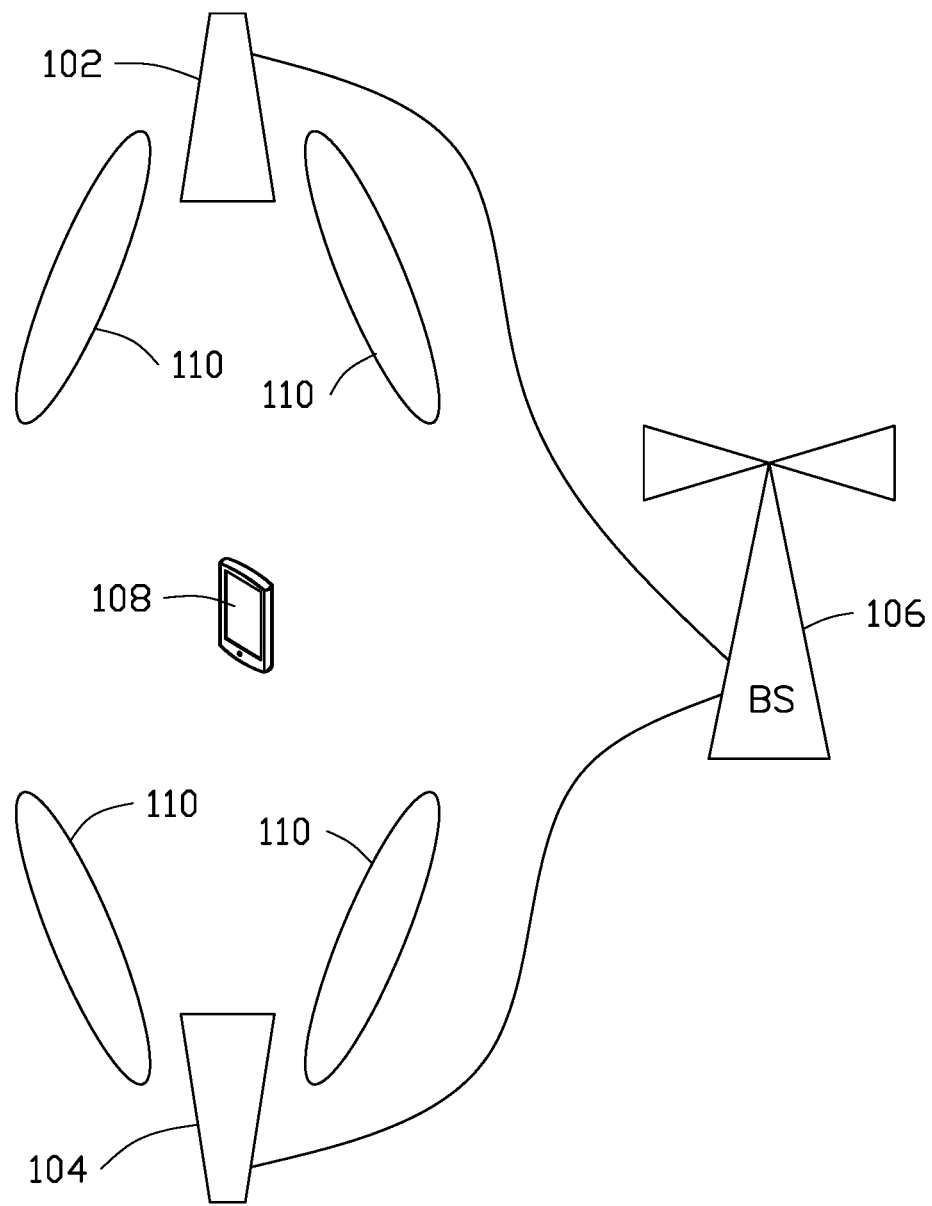
FIG. 1 is a schematic diagram illustrating a multi-TRP transmission scenario in the next generation wireless communication system, in accordance with example implementations of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read Only Memory (CD ROM), magnetic cassettes, magnetic tape, magnetic disk storage, or any other equivalent medium capable of storing computer-readable instructions.

A radio communication network architecture (e.g., an LTE system, an LTE-Advanced (LTE-A) system, or an LTE-Advanced Pro system) typically includes at least one BS, at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a Next-Generation Core (NGC), or an internet) through a Radio Access Network (RAN) established by the BS.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a Personal Digital Assistant (PDA) with wireless communication capability. The UE is configured to receive/transmit signals over an air interface from/to one or more cells in a radio access network.

A BS may include, but is not limited to, a Node B (NB) as in the UMTS, an evolved Node B (eNB) as in the LTE-A, a Radio Network Controller (RNC) as in the UMTS, a BS Controller (BSC) as in the GSM/GERAN, an NG-eNB as in an E-UTRA BS in connection with the 5GC, a gNB as in the 5G-AN, and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE), NR (often referred to as 5G), and/or LTE-A Pro. However, the scope of the present application should not be limited to the above mentioned protocols.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage, (e.g., each cell schedules the DL and optionally uplink resources to at least one UE within its radio coverage for DL and optionally uplink packet transmissions). The BS can communicate with one or more UEs in the radio communication system through the plurality of cells. A cell may allocate SideLink (SL) resources for supporting Proximity Service (ProSe). Each cell may have overlapped coverage areas with other cells.

As discussed above, the frame structure for NR is to support flexible configurations for accommodating various next generation (e.g., 5G) communication requirements, such as enhanced Mobile BroadBand (eMBB), massive Machine Type Communication (mMTC), Ultra-Reliable communication and Low Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) polar code. The coding scheme adaption may be configured based on the channel conditions and/or the service applications.

Moreover, it should be noted that in a transmission time interval TX of a single NR frame, at least DL transmission data, a guard period, and UpLink (UL) transmission data should be included. Additionally, the respective portions of the DL transmission data, the guard period, and the UL transmission data should also be configurable, for example, based on the network dynamics of NR. In addition, SL resource may also be provided in an NR frame to support ProSe services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, and B exists alone. In addition, the character "/" herein generally represents that the former and latter associated objects are in an "or" relationship.

Multi-TRP transmission (or Non-Coherent Joint Transmission (NC-JT)) may provide a flexible way to dynamically configure a TRP (e.g., including an antenna panel) according to practical applications.

FIG. 1 is a schematic diagram illustrating a multi-TRP transmission scenario in the next generation (e.g., 5G NR) wireless communication system, in accordance with example implementations of the present disclosure. As shown in FIG. 1, a UE 108 may communicate with a BS 106 (e.g., a gNB) through multiple TRPs 102 and 104. Each of the TRPs 102 and 104 may wirelessly connect to the UE 108 with one or more radio beams 110.

Generally, a TRP may include at least one antenna panel containing several antenna elements. In a multi-TRP transmission scenario, multiple TRPs (e.g., the TRPs 102 and 104) may be placed at different locations and communicate with a UE (e.g., the UE 108). For example, the antenna panels of the TRPs may be hung on the walls inside a room, outside a building, or on the roof of a house, on top of a streetlamp, etc. These antenna panels may be jointly used for DL transmissions to the users, and/or used at the transmitter(s) in a wireless backhaul, resulting in a reduced hardware cost and power consumption. Additionally, separating the TRPs at a proper distance may increase the multiplexing gain and reduce the antenna correlation.

A mechanism of multi-TRP transmission based on TRP information, according to some implementations of the present disclosure, is provided below.

TRP Information

The TRP information may help a UE to identify the correspondence between multiple TRPs and DL RS resources. In some implementations, the DL RS resources may be Quasi Co-Location (QCL) associated RS resources, such as Synchronization Signal Blocks (SSBs), CSI-RSs, and Phase-Tracking Reference Signals (PT-RSs). With the TRP information, the UE may know from which base station/TRP the transmitted DL RSs are received. In some implementations, the TRP information may be provided by the BS.

In some implementations, the TRP information may include multiple CORESET IDs. For example, a DL preemption indicator may include CORESET IDs as the TRP information. In some implementations, the TRP information may include indices of DL RSs (e.g., CSI-RS indices or SSB indices) for representing the DL beams of the TRPs. In some implementations, the TRP information may include multiple TRP IDs and/or Physical Cell Identities (PCIs) which represent different TRPs. In some other implementations, the TRP information may include a TRP mapping table which contains multiple TRP indices and DL RS resource indices. For example, the TRP mapping table may include multiple rows with each row corresponding to one TRP index. If an entry of the TRP mapping table includes multiple DL RS indices, and all of the DL RSs are Quasi Co-Located (QCL-ed) in the spatial domain (e.g. with a QCL type D or a new QCL type for multi-TRP transmission), the UE may consider that these DL RSs are transmitted from different TRPs.

In some implementations, the BS may activate multiple TCI states at the UE through RRC signaling(s), MAC CE(s), or Downlink Control Information (DCI) for PDCCH and Physical Downlink Shared Channel (PDSCH). Each TCI state may contain spatial domain information (e.g., a QCL RS with spatial domain information).

It should be noted that in some implementations, if the TCI-RS-set indicated by a TCI-State contains two different DL RSs, each DL RS may be for one of two Demodulation Reference Signal (DMRS) port groups (e.g., DMRS port group #0 and DMRS port group #1).

CSI Report and CSI Measurement

In some implementations, a UE may perform CSI reporting/measurement based on the TRP information. For example, a UE (e.g., the UE 108 shown in FIG. 1) may transmit Uplink Control Information (UCI) including a CSI report to a BS (e.g., the BS 106 shown in FIG. 1), where the CSI report may include multiple measurement results, and each of the measurement results may include a CSI-RS Resource Indicator (CRI) and a measurement parameter set corresponding to the CRI. In some implementations, each of the measurement parameter sets may include at least one of a Precoding Matrix Indicator (PMI), a Channel Quality Indicator (CQI), a Rank Indication (RI), or a Layer Indication (LI).

In some implementations, the BS may include a specific indicator (e.g., an Information Element (IE) defined as "groupBasedCSIReporting") in an RRC configuration. The UE may use the specific indicator to determine whether a CSI reporting setting is used for multi-TRP transmission. For example, when the specific indicator is enabled, the UE may measure and generate a CSI report by assuming the CSI-RS resources indicated in the CSI resource setting are transmitted from multiple TRPs. In such a case, the UE may jointly calculate and generate multiple sets of measurement results (e.g., multiple sets of CRIs/PMIs/RIs/CQIs/LIs), and include these measurement results in a CSI report. Each set of measurement results may be deemed as a TRP-specific CSI report which is provided for a specific TRP transmitting the CSI-RS resource. In some implementations, the specific indicator may be contained in a CSI report configuration (e.g., CSI-ReportConfig).

As discussed above, a UE may know the correspondence/relationship between a TRP and a CSI-RS resource/SSB based on the TRP information. In some implementations, if the TRP information includes (or represented as) a TRP mapping table, the number of rows in the TRP mapping table may correspond to the number of available TRPs for the UE, and each entry (column) in a row may include several DL RS resource indices (e.g., DL RS IDs). Different DL RS resource indices in the same row may be associated with different DL RSs transmitted from the same TRP. Hence, in some implementations, the row index in the TRP mapping table may be regarded as a TRP index.

In some other implementations, an RRC configuration may not include the groupBasedCSIReporting IE, while the reportQuantity IE of the RRC configuration may introduce a new option of "multiple PMI/CQI/RI/LI/CRI". In some other implementations, when a UE performs CSI reporting/measurement with multi-TRP transmission, the UE may include only one set of measurement results (e.g., only one PMI/CQI/RI/LI/CRI set) in a CSI report sent to the BS if the UE can only detect the CSI-RS resource(s) from one TRP at a time.

In some implementations, if the number of bits in the UCI exceeds a threshold (e.g., the maximum number of UCI bits allowed to be transmitted in the PUSCH resource) when the UE needs to perform UCI multiplexing on the PUSCH, the UE may follow a UCI dropping rule to drop at least part of the UCI bits to be transmitted. In some of such implementations, the UCI dropping rule may be dropping at least part of the UCI bits based on the TRPs' CQI values. Specifically, the CQI value may be associated with a CRI, and the UE may identify the corresponding TRP according to the CRI. Hence, the UCI bits dropping may be based on the CQI value within a CSI parameter set of the CRI, and this may happen when the CSI RS of each CRI is transmitted from different TRPs. For example, if there are two parts of UCI bits to be transmitted: a first part of the UCI bits to be transmitted to a first TRP and a second part of the UCI bits to be transmitted to a second TRP, the UE may drop the first part of the UCI bits and transmit the second part of the UCI bits when the first TRP has a lower CQI value than the second TRP. In some implementations, if there are still some available UL resources, the UE may follow an original appending priority rule to transmit the measurement results (e.g., transmitting the CRI/CQI/RI first, and then the other results). In some implementations, if a CSI report contains two LIs, each LI may correspond to the strongest layer (e.g., a layer received with the best signal quality) transmitted from the TRP indicated by the CRI.

UL Beam Management

In some implementations, a BS may indicate to a UE, e.g., through a MAC CE message, that multiple UL beams for PUCCH transmission are activated. The UE may then select at least one of the activated UL beams to transmit the PUCCH based on the UL beam information (e.g., signal quality related information). In this manner, the UE may have more flexibility to utilize the activated UL beams. For example, if the UE receives a MAC CE including multiple spatial relation information indicators (e.g., SSB indices or CRIs) from the BS, and more than one of the spatial relation information indicators are activated by the BS, the UE may perform PUCCH transmission using at least one spatial filter (e.g., UL beam) determined from the activated spatial relation information indicators. For example, the UE may select at least one particular spatial relation information indicator from the activated spatial relation information indicators according to the signal quality values of the DL signals associated with the activated spatial relation information indicators. Once the particular spatial relation information indicator is determined, the UE may apply the spatial filter(s) associated with the at least one particular spatial relation information indicator for PUCCH transmission. In some implementations, the UE may evaluate the UL beam quality and select the spatial domain filter(s) for PUCCH transmission based on the most recent qualified RS(s). In some implementations, the most recent qualified RS(s) may be the RS(s) identified from the most recent Random Access Channel (RACH), or based on the most recent measurement result.

In some implementations, if the UE's capability supports a simultaneous transmission function (e.g., the UE is able to transmit multiple PUCCHs at the same time), the UE may select multiple activated UL beams as the particular spatial relation information indicators for PUCCH transmission. For example, the UE may use multiple spatial filters associated with the particular spatial relation information indicators to transmit the PUCCHs at the same time.

In some implementations, the abovementioned implementations may also apply to the UL beam management mechanisms for transmitting the Scheduling Requests (SRs), the Hybrid Automatic Repeat Request (HARQ)-Acknowledgements (ACKs), and the CSI reports over the PUCCH resources.

In some other implementations, a BS may configure multiple PUCCH resources for CSI report transmission based on one CSI report setting, and each PUCCH resource is directed to an active/activated UL beam. The UE may select one or more of the PUCCH resources based on the most recent measurement result of the RS(s) associated with the spatial information of the PUCCH resources, and transmit information (e.g., UCI) on the selected PUCCH resource(s). In some other implementations, the BS may transmit the DCI to the UE to indicate the UL beam that has to be applied by the UE. Such an indication may be achieved by, for example, introducing a new DCI field in the DCI, or reusing a legacy DCI field.

Rate Matching for Multiple TRPs

In some implementations, after receiving the DL DCI, a UE may perform rate matching on the DL channel(s) and DL signal(s) which are scheduled by the DL DCI, if the DL DCI includes a rate matching indicator. In some implementations, the rate matching indicator may indicate one or more rate matched resource groups to be rate matched. The UE may consider the indicated rate matched resources as unavailable resources for certain DL channel(s) and DL signal(s).

In some implementations, an RRC message from a BS includes multiple rate match pattern configurations. When a UE receives the DCI including a rate matching indicator indicating a particular one of the rate match pattern configurations, the UE may identify a particular TRP transmitting the DCI according to the TRP information. The UE may then perform a rate matching procedure based on the particular rate match pattern configuration to identify at least one radio resource unavailable for a PDSCH on which a DL signal is transmitted by the particular TRP.

In some other implementations, the UE may be explicitly configured with the TRP information for each rate matched resource or each rate matched resource group. Hence, the UE may perform a TRP-level rate matching procedure after receiving the rate matching indicator. Based on the TRP information, the UE may not consider that all Resource Elements (REs) configured in the rate matched resource group are unavailable, but only those rate matched resources belonging to the TRPs.

In some other implementations, the UE may receive the DCI including a rate matching indicator that indicates a particular one of the rate match pattern configurations contained in the RRC message, where each of the rate match pattern configurations may include the TRP information. In such a case, the UE may identify, according to the TRP information, a particular TRP associated with the particular rate match pattern configuration indicated by the rate matching indicator. The UE may then perform a rate matching procedure based on the particular rate match pattern configuration to identify at least one radio resource unavailable for a PDSCH on which a DL signal is transmitted by the particular TRP. In some of such implementations, the TRP information may include indices of the DL RSs (e.g., CSI-RS indices or SSB indices) for representing the DL beams of the TRPs. For example, if the TRP information indicates an SSB #1, the UE may consider that the CORESETs and PDSCHs, which are QCL-ed with the SSB #1, are transmitted from the same TRP. Then, the UE may perform a rate matching procedure on the CORESETs and PDSCHs.

In some implementations, the spatial information (e.g., spatialinfo) of a CORESET may be included in a PDCCH configuration (e.g., PDCCH-Config) of a CORESET configuration of an RRC configuration. On the other hand, the spatial information of a PDSCH may be included in a CORESET configuration or a TCI state contained in the DL DCI (if configured).

In some implementations, the rate matched resources (or rate matched resource groups) may contain TRP IDs, and the UE may identify the DL RSs corresponding to the TRP IDs according to the TRP mapping table. Then, the UE may perform a rate matching procedure on the DL channel(s) and DL signal(s) which are spatial QCL-ed with the corresponding DL RSs.

Preemption for Multiple TRPs

In some implementations, a UE may receive the DCI from a particular TRP, where the DCI includes a DL preemption indicator containing the TRP information. Thus, the UE may identify a particular TRP associated with the DL preemption indicator according to the TRP information, and preempt a DL transmission from the particular TRP by another transmission. In some implementations, the preemption may also be known as an interrupted transmission.

In some implementations, the BS may transmit a DL preemption indicator to the UE to notify the UE of the Physical Resource Block(s) (PRB(s)) and OFDM symbol(s), where the UE may assume no transmission is intended for the UE. Specifically, because each TRP may be responsible for different services, in some implementations, the DL preemption indication may be extended from a cell level to a TRP level. In some other implementations, each serving cell may include a set of DL preemption indicators including the TRP information.

In some implementations, the TRP information contained in a DL preemption indicator may include the DL RS indices (e.g., CSI-RS indices or SSB indices) that are associated with the DL beams of the TRPs. For example, if the TRP information includes the index of SSB #1, the UE may consider that the preemption for the DL channels and DL signals which are QCL-ed with the SSB #1 are transmitted from the same TRP.

In some other implementations, the TRP information contained in a DL preemption indicator may include CORESET IDs, and the UE may perform preemption on the DL channel and DL signals scheduled by the DCI. The DCI may be transmitted on the CORESETs associated with the CORESET IDs indicated by the DL preemption indicator.

In some other implementations, the UE may be configured with a TRP mapping table (e.g., included in the TRP information) to identify the TRP(s) that transmits the DL RS(s). For example, the DL preemption indicator may include one or more TRP IDs, and the UE may use the TRP mapping table to identify the correspondence between the TRP IDs and the DL RSs transmitted by the respective TRPs. Then, the UE may perform preemption on the DL channel and DL signals scheduled by the DCI transmitted on the CORESETs which are associated with the DL RSs corresponding to the TRP IDs contained in the DL preemption indicator.

BFR Improvement for Multiple TRPs

After declaring beam failure, the UE's Physical (PHY) layer may inform its higher layer(s) of at least one of the following items: periodic CSI-RS configuration indices, SS/Physical Broadcast Channel (PBCH) block indices in a BFR candidate RS set, or the corresponding L1-Reference Signal Received Power (RSRP) measurements that are larger than or equal to a predefined threshold (e.g., Beam-failure-candidate-beam-threshold).

In some implementations, the UE's PHY layer may take the TRP information into consideration when the UE provides available RSs in the BFR candidate RS set. For example, the UE may only report the available DL RSs indices to a specific TRP that has the largest number of available RSs (e.g., having signal values larger than or equal to a predefined threshold (e.g., Beam-failure-candidate-beam-threshold)) in the measured BFR candidate RS sets. This is because the TRP with the largest number of available DL RSs may be the most robust TRP that has the largest number of transmission paths to the UE. With this TRP, the UE may have a higher chance to recover from beam failure, especially when the UE is in a high mobility state.

In some other implementations, an RRC configuration may include a specific indication allowing the UE to enable or disable the abovementioned TRP related feature (e.g., performing RS selection based on the TRP information for transmitting a Beam Failure Recovery Request (BFRQ)). The specific indication may include (or represented by) a new independent IE, or at least one IE related to the UE's mobility information (e.g., the mobility history information, and/or the information indicating that the UE is in a different mobility state). In a case that the IE(s) related to the UE's mobility information is reused, the abovementioned TRP related feature may be enabled automatically when the UE is in the high mobility state.

In some other implementations, an approach for partial BFR is introduced in BFR mechanism for multi-TRP transmission. For example, if an entry of a TCI state associated with the scheduling PDCCH includes multiple spatial domain QCL RSs (e.g., multiple RSs with the QCL type D) for a multi-TRP transmission, the UE may trigger a BFR procedure through a RACH or a PUCCH as long as the signal quality (e.g., Signal to Interference plus Noise Ratio (SINR) or RSRP) of a spatial domain QCL RS is below a threshold. For partial BFR, in some implementations, the UE may only monitor the BS's response on a CORESET based on the spatial domain filter(s) associated with the qualified QCL RSs. It should be noted that in some implementations, the abovementioned behavior may be triggered if the UE is configured to perform multi-TRP transmission based on the TRP information.

In some other implementations, if the UE triggers a BFR procedure when performing multi-TRP transmission, the UE's PHY layer may transmit a Beam Failure Indicator (BFI) to the UE's higher layer with Beam Failure Detection (BFD)-RS information. Then, the UE's higher layer may maintain a BFI counter and a BFI timer for each BFD-RS. If the BFI counter for an RS exceeds a predetermined threshold, the UE's higher layer may trigger the partial BFR procedure for the RS. On the other hand, if the BFI timer of an RS exceeds a predetermined threshold, the UE's higher layer may reset the BFI counter and BFI timer for the RS.

Blind Decoding (BD) and Control Channel Element (CCE) Limitation for Multiple TRPs The number of control channel BD and the number of CCEs for PDCCH channel estimation may be counted within a slot/non-slot and within a cell. When the counter for the number of BD and/or the counter for the number of CCE for PDCCH channel estimation exceed a predefined threshold (e.g., a configured maximum number), the UE may drop a portion of the PDCCH candidates or a portion of the CCEs for channel estimation based on a priority rule. For example, the UE may prioritize a UE-specific Search Space (USS) over a Common Search Space (CSS). However, for multi-TRP transmission, the UE may monitor the PDCCH(s) from multiple TRPs at a time. In such a case, the PDCCH monitor priority rule may be used and determined based on the TRP information. On the other hand, because the multiple TRPs connected to the UE may have different DL beams, the CORESET of each TRP may be associated with different spatial information (e.g., associated with different QCL-RSs).

In some implementations, the UE may determine whether a total number of PDCCH candidates of the TRPs for BD, or a total number of CCEs of the TRPs for PDCCH estimation, exceeds a threshold. In some of such implementations, the UE may drop at least part of the PDCCH candidates or at least part of the CCEs when the total number of the PDCCH candidates for BD or the total number of the CCEs for PDCCH estimation exceeds the threshold. In some implementations, at least one dropped PDCCH candidate or at least one dropped CCE may be determined based on an order of signal quality values of CORESETs of the PDCCHs, or a type of a search space associated with the at least one dropped PDCCH candidate or the at least one dropped CCE. In some implementations, the at least one dropped PDCCH candidate or the at least one dropped CCE may be transmitted from one of the TRPs communicating with the UE.

In some implementations, the priority of the PDCCH candidates may be determined by (but not limited to) the quality of a CORESET, or a CORESET that the UE used during an initial access phase (e.g., the CORESET #0). For example, when the total number of PDCCH candidates of the TRPs for BD exceeds a threshold, the UE may drop a portion of the PDCCH candidates according to the signal quality of each PDCCH candidate's CORESET. For example, each CORESET may be associated with a set of DL RSs (e.g., Radio Link Monitoring RSs (RLM-RSs)), and the UE may monitor the signal quality (e.g., SINR) of the DL RSs to evaluate the quality of the CORESET. In some implementations, when the UE receives multiple CORESETs from multiple TRPs at a slot or a non-slot, the UE may compare the most recent signal quality of the CORESETs, and perform BD and channel estimation based on the order of signal quality when the required number of BD or CCE channel estimation exceeds a threshold. In such a case, the UE may have a higher chance to decode the PDCCH because a PDCCH with a better signal quality has a higher priority to be decoded. In some implementations, when the CORESET that has to be decoded first is determined, the priority rule may follow an original priority rule defined in the NR technical documents. In some other implementations, the UE may apply a search space priority rule first (e.g., the CSSs of all TRPs may have a higher priority than the USSs of all TRPs), and then apply the proposed TRP related priority rule when the required number of BD or CCE channel estimation exceeds a threshold.

Physical Channel and/or RSs Multiplexing for Multiple TRPs

When a UE attempts to receive multiple physical channels and/or RSs at the same OFDM symbol, the UE may assume that a portion or all of the physical channels and/or RSs may be received at the same time based on the TRP information (e.g., including a new TCI state or a TRP mapping table). In some implementations, if the UE supports a simultaneous reception function, which means the UE may have multiple antenna ports or multiple antenna panels to receive different channels or RSs by applying different spatial domain filters, the UE may receive physical channels and/or RSs from different TRPs at the same OFDM symbol. Otherwise (e.g., when the UE does not support the simultaneous reception function), the UE may only receive the physical channel and/or RS from a TRP due to the spatial domain filter restriction, and the UE may not expect to receive the physical channel and/or RS from different TRPs. In some implementations, the UE may choose a TRP having a higher priority to receive the physical channel and/or RSs based on the UE's implementation. In some other implementations, the UE may first choose the TRP used in the initial access phase. The physical channels may be, but not limited to, PDCCHs or PDSCHs. The RSs may be, but not limited to, PT-RSs, CSI-RSs, DMRSs or SSBs.

Case 1—CSI Reporting in Multi-TRP Transmission by Group Based CSI Indicator

Action #0. a BS may configure a UE with a CSI measurement configuration (e.g., CSI-MeasConfig) which may include a CSI report configuration (e.g., CSI-ReportConfig) and a CSI resource configuration (e.g., CSI-ResourceConfig). In the present implementation, the UE may be configured with a CSI-ReportConfig to perform a periodic reporting, and the UE may calculate and report CRI/RI/PMI/LI/CQI according to a CSIReportQuantity IE contained in the CSI-ReportConfig.

FIG. 2A is a schematic diagram illustrating a CSI report configuration (e.g., CSI-ReportConfig 202), in accordance with example implementations of the present disclosure. FIG. 2B is a schematic diagram illustrating a CSI resource configuration (e.g., CSI-ResourceConfig 204), in accordance with example implementations of the present disclosure.

As shown in FIGS. 2A and 2B, the CSI-ReportConfig 202 is associated with CSI-ResourceConfig #1 which includes the NZP-CSI-RS-Resourceset #2. The NZP-CSI-RS-Resourceset #2 contains NZP-CSI-RS-Resource #0, NZP-CSI-RS-Resource #1, NZP-CSI-RS-Resource #2 and NZP-CSI-RS-Resource #3. The UE is also configured with a GroupBasedCSIReporting IE. When the value of the GroupBasedCSIReporting IE is set as true, the UE may report and calculate the CSI for multiple TRPs.

Action #1. In a slot that the UE is configured to perform the CSI measurement according to the CSI-ReportConfig, the UE may measure all the CSI-RS resources based on the TRP information. In some implementations, different CSI-RS resources may be considered as different QCL-RSs which are associated with different beam forming directions from different TRPs. The UE may know the association between the QCL-RSs and the TRPs based on the TRP information.

FIG. 3 is a schematic diagram illustrating a TRP mapping table contained in the TRP information, in accordance with example implementations of the present disclosure. As shown in FIG. 3, a TRP mapping table 302 contains two rows (e.g., Row1 and Row2) of TRP indices, which means two TRPs (e.g., a TRP #1 and a TRP #2) serve the UE in this slot. It should be noted that the TRP mapping table 302 shown in FIG. 3 is only for illustrative purposes, not for limiting the present invention, as those skilled in the art can readily appreciate that such TRP mapping table may be implemented in various data formats and/or contents.

Action #2. With the TRP mapping table 302, the UE may know that the Non Zero Power (NZP)-CSI-RS resource #0 (e.g., the CRI #0) and NZP-CSI-RS resource #1 (e.g., the CRI #1) are both transmitted from the TRP #1, and the NZP-CSI-RS resource #2 (e.g., the CRI #2) and the NZP-CSI-RS resource #3 (e.g., the CRI #3) are both transmitted from the TRP #2. Furthermore, the UE may receive the NZP-CSI-RS resource #0 and the NZP-CSI-RS resource #1 through one spatial receiver filter, and receive the NZP-CSI-RS resource #2 and the NZP-CSI-RS resource #3 through another spatial receiver filter. This means that the NZP-CSI-RS resource #0 and the NZP-CSI-RS resource #1 may not be received at the same time, and the NZP-CSI-RS resource #2 and the NZP-CSI-RS resource #3 may not be received at the same time either.

Figure 4:
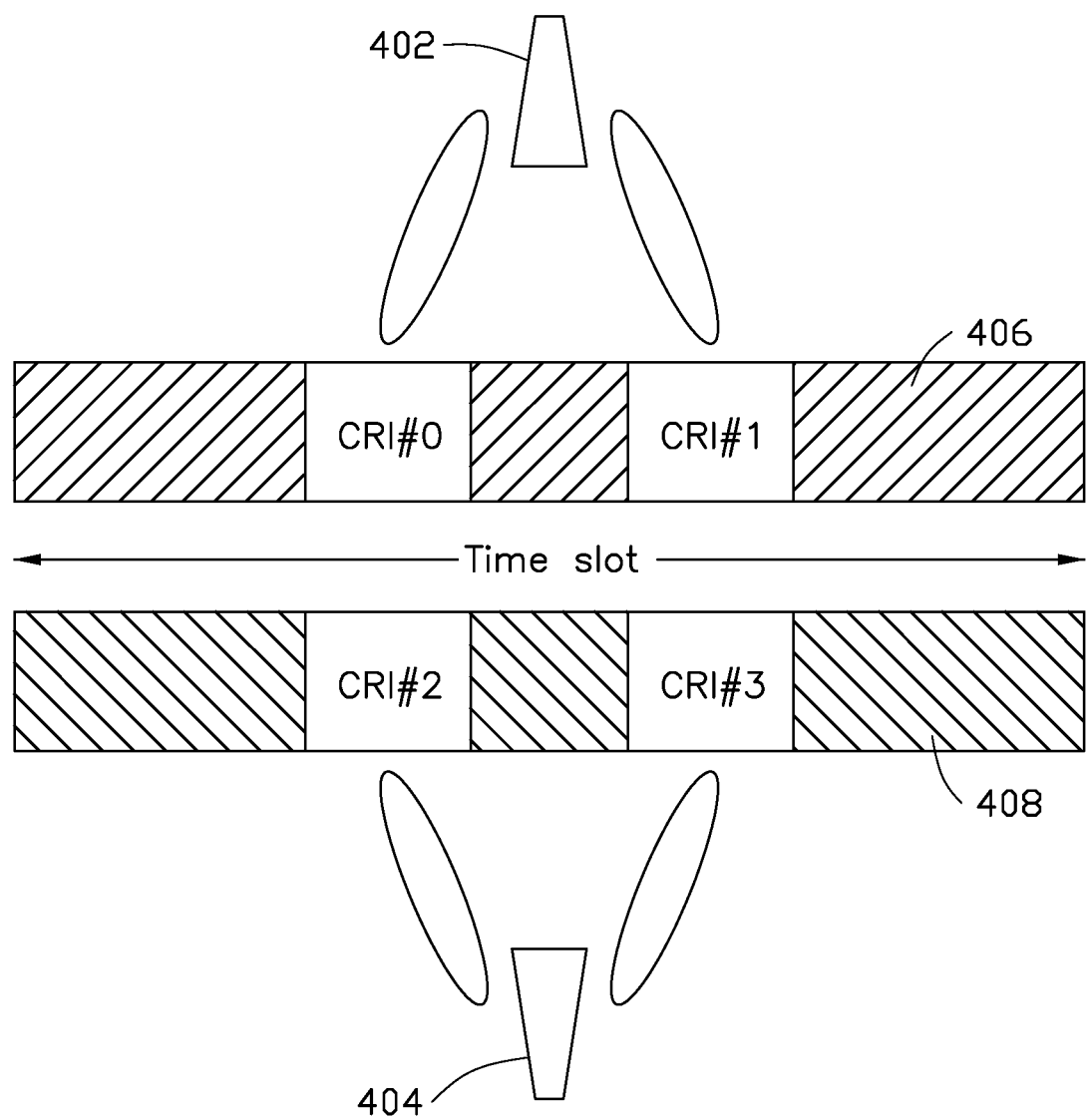
FIG. 4 is a schematic diagram illustrating a scenario of a multi-TRP transmission, in accordance with example implementations of the present disclosure.

FIG. 4 is a schematic diagram illustrating a scenario of a multi-TRP transmission, in accordance with example implementations of the present disclosure. As shown in FIG. 4, a UE may communicate with multiple TRPs 402 and 404. The UE may be configured with a CSI-ResourceConfig to measure all NZP-CSI-RS resources from the TRPs 402 and 404 (e.g., CRI #0 and CRI #1 on a DL channel 406 from the TRP 402, and CRI #2 and CRI #3 on a DL channel 408 from the TRP 404).

It should be noted that in the present implementation, the UE is not necessarily receiving the CSI-RS resources from different TRPs at the same OFDM symbol. Instead, the UE may only receive the NZP-CSI-RS resources from one TRP through a single spatial receiver filter.

Action #3. After performing the CSI measurement, if the UE finds that the combination of the NZP-CSI-RS resource #1 and the NZP-CSI-RS resource #2 has a better performance than other combinations, the UE may calculate PMIs, CQIs, LIs, and RIs based on a condition of simultaneously receiving the NZP-CSI-RS resource #1 and NZP-CSI-RS resource #2 from the TRP #1 and the TRP #2. For example, the PMI #1, the CQI #1, the LI #1 and the RI #1 are the PMI, CQI, LI and RI for the TRP #1; the PMI #2, the CQI #2, the LI #2 and the RI #2 are the PMI, CQI, LI and RI for the TRP #2.

Action #4. Accordingly, the UCI bits of a CSI report may contain the CRI #1, the CRI #2, the PMI #1, the PMI #2, the CQI #1, the CQI #2, the LI #1, the LI #2, the RI #1 and the RI #2. Then, the UE may transmit the UCI via the PUCCH resource configured in the CSI-ReportConfig (e.g., the CSI-ReportConfig 202).

Action #5. In some implementations, if the UE has to perform UCI multiplexing, and the number of UCI bits obtained in Action #4 exceeds a maximum allowed number of bits in the allowed UCI resource configured in PUSCH configuration, the UE may drop at least part of the UCI bits according to, for example, the CQI value of each TRP. For example, if the value of CQI #1 is 10 and the value of CQI #2 is 8, the UE may transmit the CRI #1, the PMI #1, the RI #1, the LI #1 and the CQI #1 first, and then follow an original rule (e.g., an original rule for UCI priority which is defined in NR rel-15) to append the RI #2, the CQI #2, the PMI #2, the LI #2 and the CRI #2 in the UCI if there are still available resources for transmitting the UCI on the PUSCH.

Case 2—UL Beam Management for PUCCH based on Quality of Associated Spatial Domain Transceiver Information FIG. 5A is a schematic diagram illustrating a CSI report configuration (e.g., CSI-ReportConfig), in accordance with example implementations of the present disclosure.

Action #0. As shown in FIG. 5A, a UE is configured with a CSI-ReportConfig 502 to perform periodic CSI reporting. The CSI-ReportConfig 502 may include an IE PUCCH-CSI-Resource which indicates that the UE may use the PUCCH resource #10 to transmit a CSI report.

FIG. 5B is a schematic diagram illustrating a PUCCH configuration (e.g., PUCCH-Config) of an RRC configuration, in accordance with example implementations of the present disclosure. As shown in FIG. 5B, a PUCCH-Config 504 may include multiple PUCCH resource sets (e.g., PUCCH-ResourceSet #0, PUCCH-ResourceSet #1 and PUCCH-ResourceSet #2). In the present implementation, the UE is configured with the PUCCH-ResourceSet #2 which contains the PUCCH resource #10. To support the beam operation for PUCCH transmission, the PUCCH-Config 504 may further contain spatial relation information (e.g., spatialRelationInfo) which includes the SSB #0 (which corresponds to the bit $S_0$ in FIG. 6), the SSB #1 (which corresponds to the bit $S_1$ in FIG. 6), the SSB #2 (which corresponds to the bit $S_2$ in FIG. 6), the SSB #3 (which corresponds to the bit $S_3$ in FIG. 6), the CRI #0 (which corresponds to the bit $S_4$ in FIG. 6), the CRI #1 (which corresponds to the bit $S_5$ in FIG. 6), the CRI #2 (which corresponds to the bit $S_6$ in FIG. 6), and the CRI #3 (which corresponds to the bit $S_7$ in FIG. 6).

Figure 6:
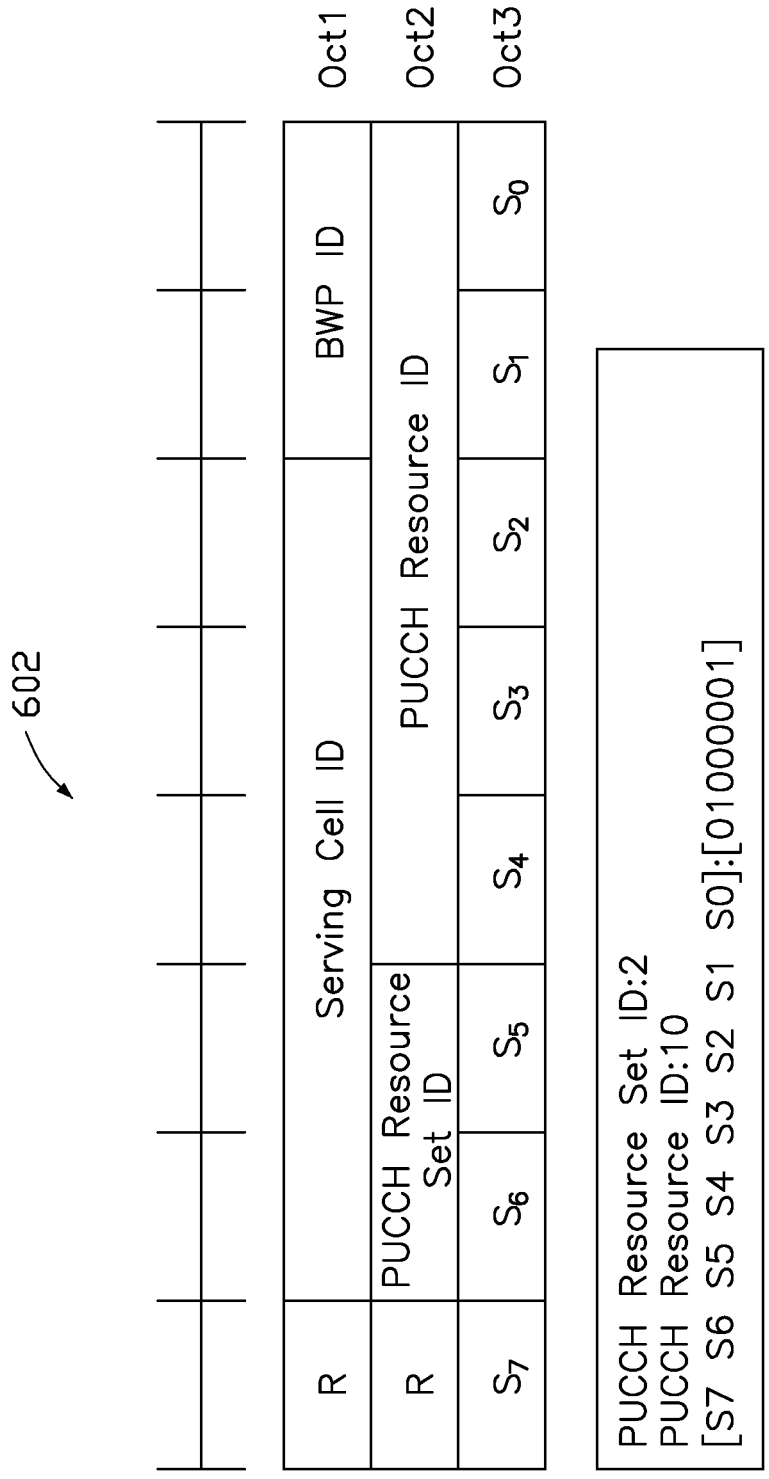
FIG. 6 is a schematic diagram illustrating a Medium Access Control (MAC) Control Element (CE) for PUCCH spatial relation activation/deactivation, in accordance with example implementations of the present disclosure.

Action #1. FIG. 6 is a schematic diagram illustrating a MAC CE for PUCCH spatial relation activation/deactivation, in accordance with example implementations of the present disclosure. As shown in FIG. 6, the field of spatial relation information indicators [$S_7$ $S_6$ $S_5$ $S_4$ $S_3$ $S_2$ $S_1$ $S_0$] of the MAC CE 602 is represented as [0 1 0 0 0 0 0 1], which means that a MAC CE 602 may activate both of the PUCCH spatial relation info #0 (which is corresponding to the bit $S_0$) and the PUCCH spatial relation info #6 (which is corresponding to the bit $S_6$), and deactivate the others. Please also refer to FIG. 5B. It can be seen that in the present implementation the PUCCH spatial relation info #0 and the PUCCH spatial relation info #6 may map to the SSB #0 and the CRI #2 in the spatialRelationInfo IE of the PUCCH-Config 504, respectively. The MAC CE 602 may further include a PUCCH resource set ID (e.g., the PUCCH resource set #2) and a PUCCH resource ID (e.g., the PUCCH resource #10) to indicate the target for activation. Other information such as the serving cell ID and the Bandwidth Part (BWP) ID may also be included in the MAC CE 602.

Action #2. After the UE receives the MAC CE 602 for activation, the UE may trigger a period CSI reporting, based on the CSI-ReportConfig 502 for example, and the UE may transmit a CSI report on the PUCCH resource #10. In the present implementation, because there are two available UL beams (e.g., associated with the SSB #0 and the CRI #2) for PUCCH resource #10, the UE may select one of them to perform the PUCCH transmission if the UE does not support a simultaneous uplink PUCCH transmission function for a cell.

Action #3. In the present implementation, the UE may compare the most recent measurement result of the SSB #0 with that of the CRI #2. The measurement result may have various data formats, such as L1-RSRP, Reference Signal Received Quality (RSRQ) and SINR, depending on the configuration from the BS, or the definition specified in the 3GPP specification. For example, the UE may compare the L1-RSRP of the SSB #0 with the L1-RSRP of the CRI #2. If the L1-RSRP of the SSB #0 exhibits a better performance than the CRI #2, the UE may choose the spatial filter for receiving the SSB #0 as the spatial filter for transmitting the PUCCH resource #10.

Case 3—Rate Matching in Multi-TRP Transmission by Implicit Information

Figure 7A:
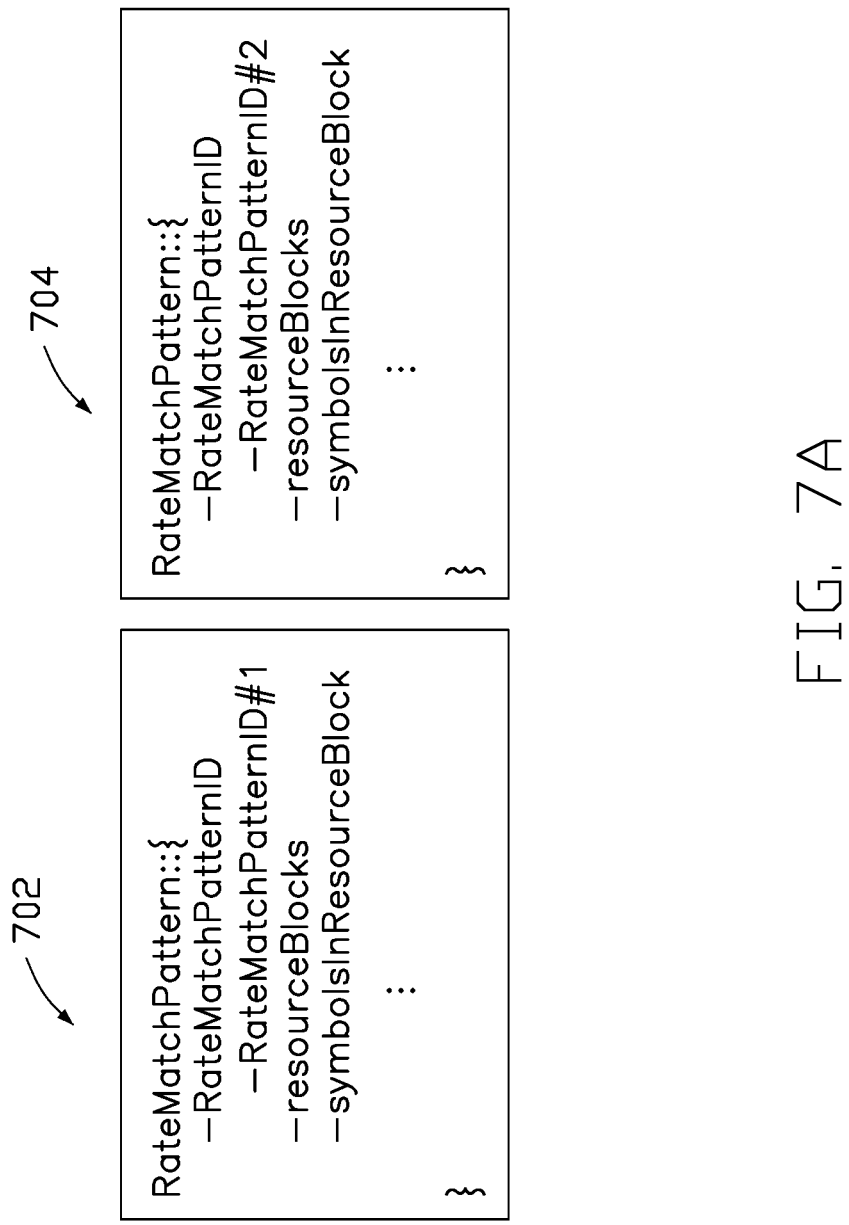
FIG. 7A is a schematic diagram illustrating rate match patterns of an RRC configuration, in accordance with example implementations of the present disclosure.

Action #0. FIG. 7A is a schematic diagram illustrating rate match patterns of an RRC configuration, in accordance with example implementations of the present disclosure. As shown in FIG. 7A, the UE is configured with a rate match pattern #1 702 and a rate match pattern #2 704. The rate match pattern #1 702 and the rate match pattern #2 704 may be contained in the RateMatchPattern IE of the RRC signaling, and configured with different resource allocations (e.g., time and frequency resource allocations).

FIG. 7B is a schematic diagram illustrating a PDCCH configuration (e.g., PDCCH-Config), in accordance with example implementations of the present disclosure. As shown in FIG. 7B, the UE may be further configured with a CORESET #1 and a CORESET #2 in a PDCCH-Config 706 for monitoring the DCI. In the present implementation, the UE may have already obtained the TRP information (e.g., the TRP mapping table 302 as shown in FIG. 3) from the BS. Hence, the UE may identify that the CORESET #1 is transmitted from the TRP #1, and the CORESET #2 is transmitted from the TRP #2.

Action #1a. In the present implementation, the UE may receive the first DL DCI containing a rate matching indicator being set with a value of "01" (e.g., for indicating the rate match pattern #1 702 in FIG. 7A) on the CORESET #1, and receive the second DL DCI containing another rate matching indicator being set with a value of "00" (e.g., for indicating no rate matching is to be performed) on the CORESET #2. After receiving the first and second DL DCIs, the UE may perform rate matching for the DL channels and DL signals transmitted from the TRP #1 (e.g., the DL channel and DL signals scheduled by the first DL DCI) based on the resource configured by the rate match pattern #1, and not perform rate matching on the scheduling resource as indicated by the second DL DCI.

Action #1b. In some other implementations, the UE may receive the second DL DCI containing a rate matching indicator being set with a value of "01" (e.g., for indicating the rate match pattern #1 702 in FIG. 7A) on the CORESET #2, and receive the first DL DCI containing another rate matching indicator being set with a value of "10" (e.g., for indicating the rate match pattern #2 704 in FIG. 7A) on the CORESET #1. The UE may then perform rate matching for the DL channel and DL signals transmitted from the TRP #1 and the TRP #2, respectively. Specifically, the DL channel and DL signals scheduled by the first DL DCI on CORESET #1 may be rate matched based on the resource configured by the rate match pattern #2 (e.g., the rate match pattern #2 704). Similarly, the DL channel and DL signals scheduled by the second DL DCI on the CORESET #2 may be rate matched based on resource configured by the rate match pattern #1 (e.g., the rate match pattern #1 702).

Case 3-1—Rate Matching in Multi-TRP Transmission by Explicit Information

Figure 8A:
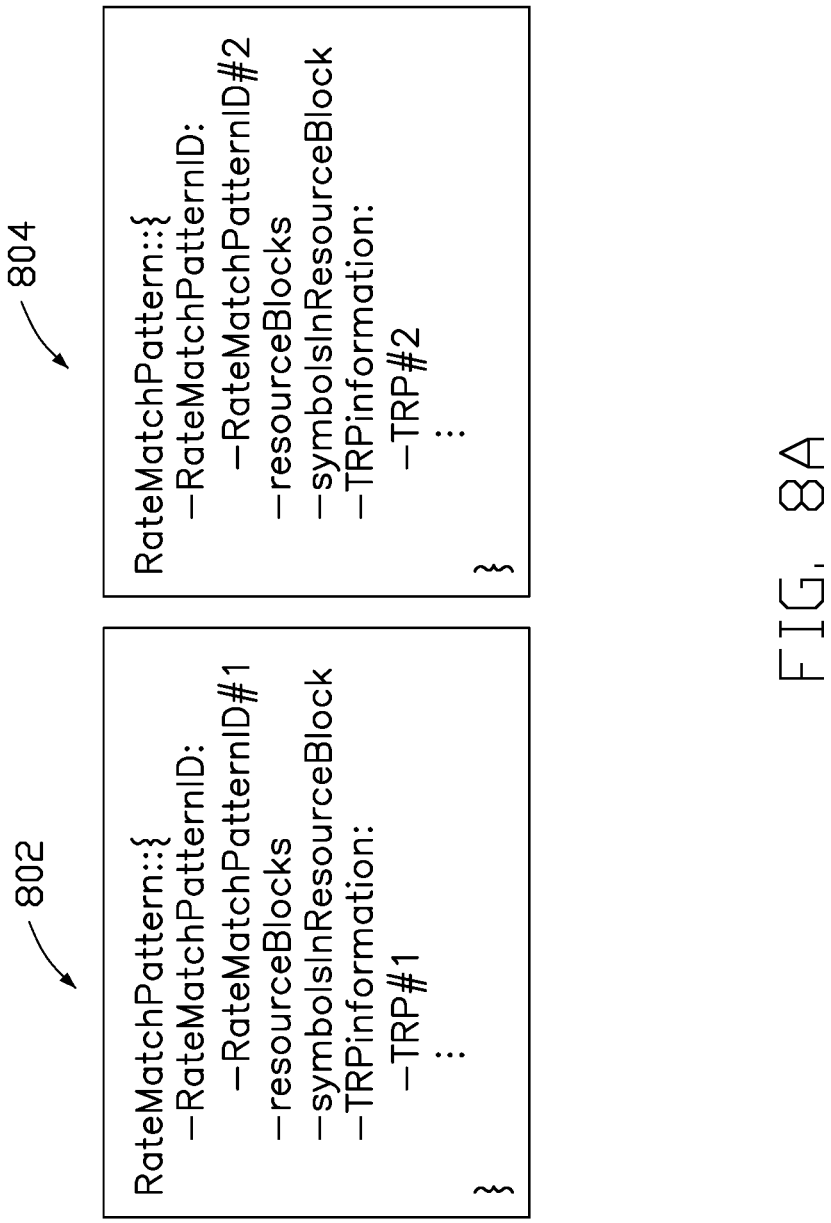
FIG. 8A is a schematic diagram illustrating rate match patterns of an RRC configuration, in accordance with example implementations of the present disclosure.

Action #0. FIG. 8A is a schematic diagram illustrating rate match patterns of an RRC configuration, in accordance with example implementations of the present disclosure. As shown in FIG. 8A, the UE is configured with a rate match pattern #1 802 and a rate match pattern #2 804. The rate match pattern #1 802 and the rate match pattern #2 804 may be contained in the RateMatchPattern IE of RRC signaling, and configured with different resource allocations (e.g., time and frequency resource allocations) and TRP information (e.g., TRP IDs or TRP indices of a TRP information mapping table, or CORESET configurations).

FIG. 8B is a schematic diagram illustrating a PDCCH configuration (e.g., PDCCH-Config), in accordance with example implementations of the present disclosure. As shown in FIG. 8B, the UE may be further configured with a CORESET #1 and a CORESET #2 in a PDCCH-Config 806 for monitoring the DCI. In the present implementation, the UE may have already obtained the TRP information (e.g., the TRP mapping table 302 as shown in FIG. 3) from the BS. Hence, the UE may identify that the CORESET #1 is transmitted from the TRP #1, and the CORESET #2 is transmitted from the TRP #2. Moreover, the value of tci-PresentinDCI IE of the PDCCH-Config 806 for the CORESET #1 is disabled, and the value of tci-PresentinDCI IE in the PDCCH-Config 806 of CORESET #2 is enabled. Hence, the PDSCH scheduled by the DL DCI on the CORESET #2 is spatial QCL-ed with the CRI #2 (which is the same as the CORESET #1). On the other hand, the spatial information of the PDSCH scheduled by the DL DCI of CORESET #1 is determined by a TCI-state contained in the DL DCI received on the CORESET #1.

Action #1a. In the present implementation, if the UE receives the first DL DCI containing a rate matching indicator being set with a value of "00" (e.g., for indicating no rate matching is to be performed) on the CORESET #1, and receives the second DL DCI containing another rate matching indicator being set with a value of "01" (e.g., for indicating the rate match pattern #1 802 in FIG. 8A) on the CORESET #2, the UE may perform rate matching for the DL channels and DL signals which are spatial QCL-ed with CRI #0 and CRI #1 according to the TRP mapping table 302 shown in FIG. 3. Hence, the UE may perform rate matching on both of the CORESET #1 and the PDSCH scheduled by the first DL DCI.

Action #1b. In some other implementations, the UE may receive the first DL DCI on the CORESET #1 and does not receive any DL DCI on the CORESET #2. The rate matching indicator in the first DL DCI may be set with a value of "10", which indicates the rate match pattern #2 (e.g., the rate match pattern #2 804). Accordingly, based on the TRP mapping table 302 shown in FIG. 3, the UE may perform rate matching for the DL channels and DL signals which are spatial QCL-ed with the CRI #2 and CRI #3. On the other hand, the TCI-state contained in the first DL DCI may include "CRI #0 and CRI #2". Hence, the UE may perform rate matching on the PDSCH of the DMRS port group #1 scheduled by the first DL DCI. It should be noted that if the TCI-RS-set indicated by the TCI-state includes two different DL RSs, each DL RS is for one of the two DMRS port groups (e.g., the DMRS port group #0 and the DMRS port group #1). A DMRS port group may be referred to as the Code Division Multiplexing (CDM) group according to RAN1 agreement.

Action #1c. In some other implementations, the UE may receive the first DL DCI on the CORESET #1 and does not receive any DL DCI on the CORESET #2, and the rate matching indicator contained in the first DL DCI may be set with a value of "11", which indicates that both rate match patterns (e.g., the rate match pattern #1 802 and the rate match pattern #2 804 in FIG. 8A) in the RRC configuration may be used. Then, according to the TRP mapping table 302 shown in FIG. 3, the UE may perform rate matching for the DL channel and DL signals which are spatial QCL-ed with the CRI #0, the CRI #1, the CRI #2 and the CRI #3. Meanwhile, because the TCI-states contained in the first DL DCI on the CORESET #1 are "CRI #0 and CRI #2," the UE may perform rate matching on the PDSCH of the DMRS port group #0 and the DMRS port group #1 scheduled by the first DL DCI on the CORESET #1.

Case 4—Interrupted Transmission in Multi-TRP Transmission

Figure 9:
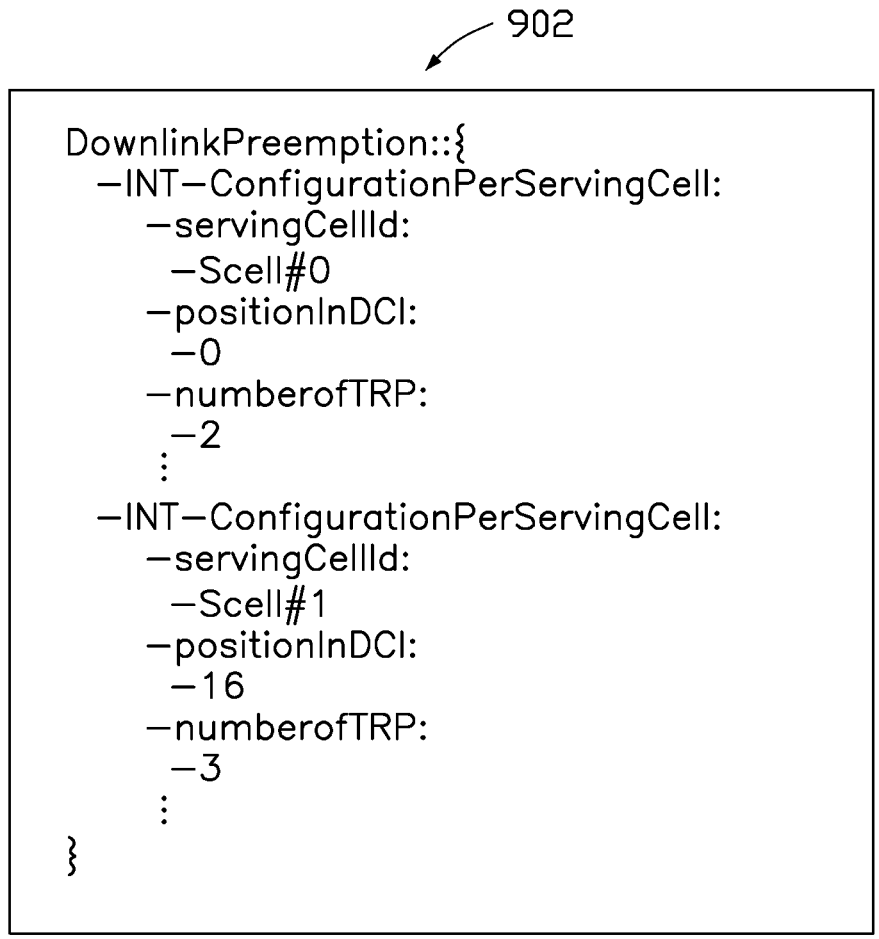
FIG. 9 is a schematic diagram illustrating a DL preemption configuration of an RRC configuration, in accordance with example implementations of the present disclosure.

Action #0. FIG. 9 is a schematic diagram illustrating a DL preemption configuration (e.g., DownlinkPreemption) of an RRC configuration, in accordance with example implementations of the present disclosure. As shown in FIG. 9, the UE is configured with DownlinkPreemption 902 in an RRC configuration. The DownlinkPreemption 902 may contain an int-ConfigurationPerServingCell IE, which may include servingCellId, positionInDCI (e.g., the starting position in DCI) and numberofTRP. According to the DownlinkPreemption 902, the UE may be configured with an SCell #0 and an SCell #1. The UE may connect to two TRPs (numberofTRP=2) for the SCell #0 and three TRPs (numberofTRP=3) for the SCell #1. In the present implementation, the size of the DL preemption indicator for each SCell may be fixed (e.g., 14 bits). Therefore, the total size of DCI for DL preemption that the UE expects to receive is 2+14+3+14=33 bits.

Figure 10:
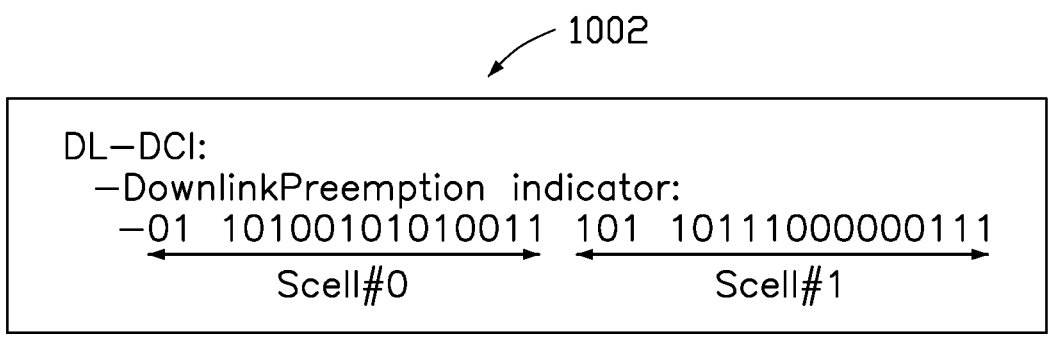
FIG. 10 is a schematic diagram illustrating a DL preemption indicator contained in the DL Downlink Control Information (DCI), in accordance with example implementations of the present disclosure.

Action #1. FIG. 10 is a schematic diagram illustrating a DL preemption indicator contained in the DL DCI, in accordance with example implementations of the present disclosure. As shown in FIG. 10, after the UE receives and successfully decodes DL DCI 1002, the UE may obtain the DL preemption indicator for both of the SCell #0 and the Scell #1. In the present implementation, the first 16 bits (the first bit group) may be for the SCell #0 and the remaining 17 bits (the second bit group) may be for the SCell #1. Moreover, the last 14 bits of each bit group may be for a time and frequency resource allocation, and the remaining Most Significant Bits (MSBs) (e.g. the two bits "01" for the SCell #0 and the three bits "101" for SCell #1) may be for the TRP IDs. As shown in FIG. 10, the TRP ID "01" for the SCell #0 means that the DL channel from the TRP #1 of the SCell #0 may be preempted by another transmission (e.g., a transmission from another service). Similarly, the TRP ID "101" for the SCell #1 means that the DL channel from both of the TRP #1 and the TRP #3 of the SCell #1 may be preempted by another transmission.

Case 5—Candidate Beam Selection for BFR by PHY Layer of UE in Multi-TRP Transmission Action #0. FIG. 11 is a schematic diagram of a BFR configuration (e.g., BeamFailureRecoveryConfig) in an RRC configuration, in accordance with example implementations of the present disclosure. As shown in FIG. 11, the UE is configured with a BeamFailureRecoveryConfig 1102 in an RRC configuration. The BeamFailureRecoveryConfig 1102 contains a candidateBeamRSList IE which may include several SSB indices and/or CRIs for the BFR candidate beams. In some implementations, the BeamFailureRecoveryConfig 1102 may also include a candidateBeamThreshold IE which is represented by an L1-RSRP value for the UE to select available DL RSs. As shown in FIG. 11, the UE is configured with the CRI #0, the CRI #1, . . . , and the CRI #7 in the candidateBeamRSList IE, and the candidateBeamThreshold IE is set as −65 (dBm). In some of such implementations, the UE may be further configured with a TRP mapping table as shown in FIG. 12.

FIG. 12 is a schematic diagram of a TRP mapping table included in the TRP information, in accordance with example implementations of the present disclosure. As shown in FIG. 12, from a TRP mapping table 1202, the UE may identify that the CSI-RS resource #0, the CSI-RS resource #1 and the CSI-RS resource #2 are transmitted from the TRP #1; the CSI-RS resource #3, the CSI-RS resource #4 and the CSI-RS resource #5 are transmitted from the TRP #2; and the CSI-RS resource #6 and the CSI-RS resource #7 are transmitted from the TRP #3.

Action #1. In some implementations, the UE's PHY layer may transmit the L1-RSRP measurement results for the RSs indicated in the candidateBeamRSList IE when a beam failure event is declared by the higher layer. In the present implementation, it is assumed that the L1-RSRP measurement results of the CSI-RS resource #0 to #7 are −52 dBm, −56 dBm, −60 dBm, −32 dBm, −70 dBm, −75 dBm, −90 dBm and −92 dBm, respectively.

Action #2. In some implementations, the UE may be determined as being operated in a high mobility state according to the most recent measurement report (e.g., the beam report and/or the mobility state history). The UE's PHY layer may select one or more candidate DL RSs from one TRP which has the largest number of available transmission paths (e.g., DL beams). For example, in the present implementation, only the values of the CSI-RS resource #0, the CSI-RS resource #1, the CSI-RS resource #2 and the CSI-RS resource #3 are above the candidateBeamThreshold. These CSI-RS resources may be deemed as candidate DL RSs for the BFR.

Based on the TRP mapping table 1202, the UE may know that three of the candidate DL RSs (e.g., the CSI-RS resource #0, the CSI-RS resource #1, and the CSI-RS resource #2) are transmitted from the TRP #1 and only one candidate DL RS (e.g., the CSI-RS resource #3) is transmitted from the TRP #2. Therefore, the UE's PHY layer may only provide a candidate RS set {CSI-RS resource #0, CSI-RS resource #1 and CSI-RS resource #2} to the UE's higher layer to trigger the BFRQ.

Action #3. In some implementations, after the UE's higher layer receives the candidate RS set, the UE's higher layer may choose one candidate DL RS from the candidate RS set provided by the PHY layer, and transmit the BFRQ based on the associated RACH configuration of the chosen candidate DL RS.

Case 5-1—Candidate Beam Selection for BFR by Higher Layer of UE in Multi-TRP Transmission Action #0 and Action #1. For a brief description, these two actions may be the same as Action #0 and Action #1 in Case 5, respectively.

Action #2. In the present implementation, the UE's PHY layer may select the candidate DL RSs based on the candidateBeamThreshold IE. For example, if only the CSI-RS resource #0, the CSI-RS resource #1, the CSI-RS resource #2 and the CSI-RS resource #3 are above candidateBeamThreshold IE, the UE's PHY layer may provide a candidate RS set of {CSI-RS resource #0, CSI-RS resource #1, CSI-RS resource #2, CSI-RS resource #3} to the higher layer to trigger the BFRQ.

Action #3. After the UE's higher layer receives the candidate RS set, the UE's higher layer may choose one of the RSs from the candidate RS set and transmit a BFRQ based on the associated RACH configuration of the selected RS. Since the UE is determined as being operated in a high mobility state according to the most recent measurement report, the UE's higher layer may select the candidate DL RSs transmitted from the TRP which has the largest number of available transmission paths based on the TRP mapping table (e.g., the TRP mapping table 1202 in FIG. 12). For example, the UE's higher layer may select the CSI-RS resource #0 to use because the CSI-RS resource #0 has a better L1-RSRP than the CSI-RS resource #1, the CSI-RS resource #2, and the CSI-RS resource #3.

Case 5-2—Partial BFR in Multi-TRP Transmission

Figure 13:
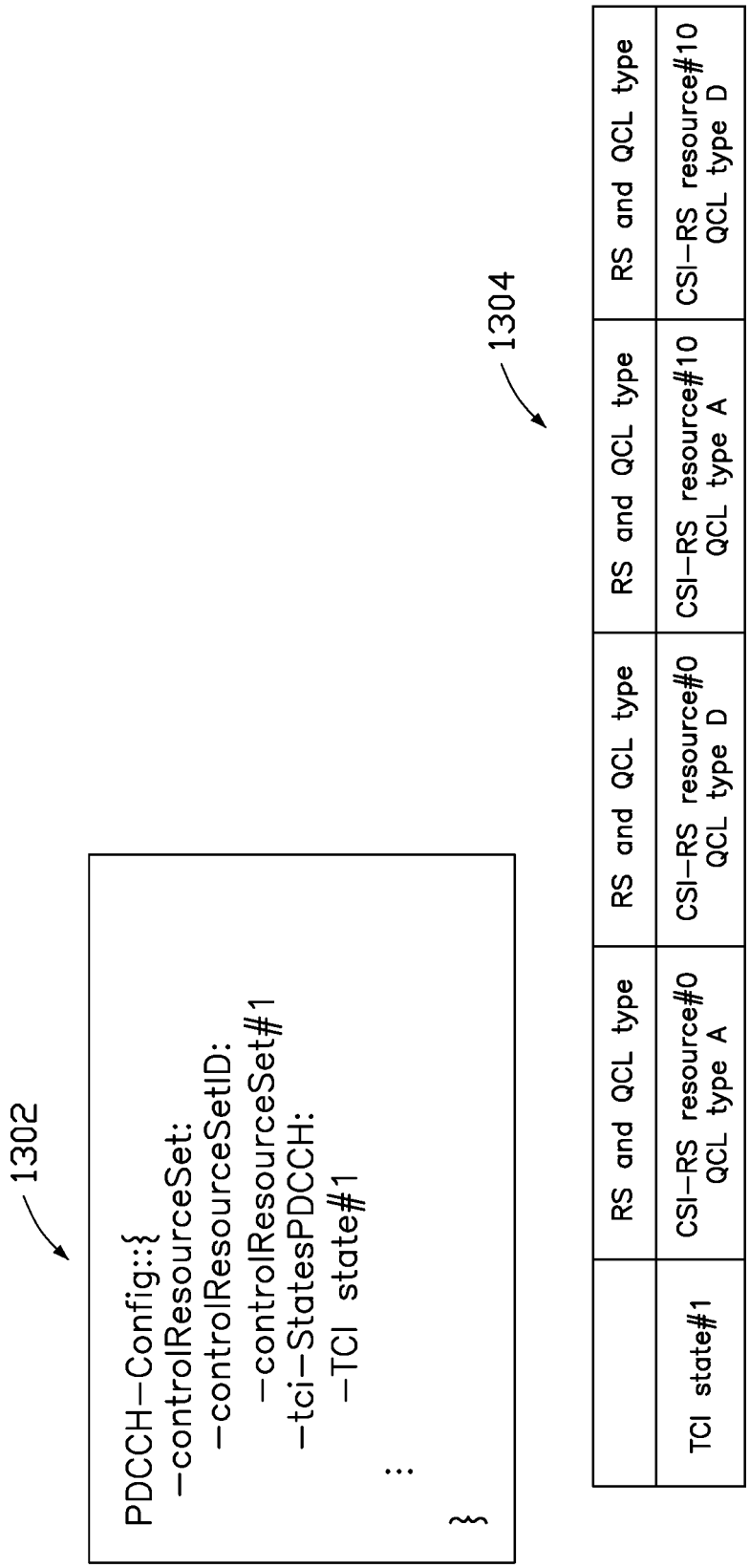
FIG. 13 is a schematic diagram illustrating a PDCCH configuration and a Transmission Configuration Indicator (TCI) state related mapping table, in accordance with example implementations of the present disclosure.

Action #0. FIG. 13 is a schematic diagram illustrating a PDCCH configuration (e.g., PDCCH-Config) and a TCI state related mapping table, in accordance with example implementations of the present disclosure. In the present implementation, the UE may not be explicitly configured with a failureDetectionResource IE by the BS. Hence, the UE may implicitly obtain the information on the failureDetectionResource IE based on the TCI state associated with a CORESET. As shown in FIG. 13, according to a TCI state related mapping table 1304 and a PDCCH-Config 1302, the UE may know that the CORESET is used for multi-TRP transmission, because the TCI state #1 is associated with two different type D CSI RS resources (e.g., the CSI-RS resources #0 and the CSI-RS resources #10).

Action #1. In some implementations, the UE may keep monitoring the CSI-RS resources #0 and the CSI-RS resources #10 based on periodicity of each RS, and transmit a Beam Failure Indicator (BFI) to the higher layer if the SINR of each RS is below a threshold. For example, if the SINR of the CSI RS resource #0 is below the threshold, the UE's PHY layer may transmit the RS information and the BFI to its higher layer, and the BFI counter set for the CSI RS resource #0 may increase by 1.

Action #2. In some implementations, if the BFI counter set for the CSI RS resource #0 exceeds the threshold, while the BFI counter set for the CSI RS resource #10 is below the threshold, the UE's higher layer may trigger a partial BFR and indicate the UE's PHY layer to transmit a BFRQ by RACH or PUCCH. In some implementations, after transmitting the BFRQ, the UE may monitor the response of the BS on the CORESET by using the same spatial filter for receiving the CSI RS resource #10.

Case 6—Priority Rule of PDCCH BD and CCE for Channel Estimation Restriction in Multi-TRP Transmission Action #0. FIG. 14 is a schematic diagram illustrating a PDCCH configuration (e.g., PDCCH-Config) of an RRC configuration, in accordance with example implementations of the present disclosure. As shown in FIG. 14, the UE is configured with a PDCCH-Config 1402 which may include configurations of CORESET #2 and CORESET #3. The spatial information of the CORESET #2 and the CORESET #3 are CRI #0 and CRI #2, respectively, the configuration of the CORESET #2 contains Searchspace #4 and Searchspace #5, and the configuration of CORESET #3 contains Searchspace #6 and Searchspace #7.

In the present implementation, the UE may receive the TRP information including a TRP mapping table (e.g., the TRP mapping table 302 shown in FIG. 3) from the BS. Hence, —with the TRP mapping table, the UE may identify that the CORESET #2 is transmitted from the TRP #1 and the CORESET #3 is transmitted from the TRP #2.

FIG. 15 is a schematic diagram illustrating the maximum number of PDCCH candidates per slot and per serving cell under different Sub-Carrier Spacing (SCS) values (e.g., 15, 30, 60 and 120 KHz), in accordance with example implementations of the present disclosure. According to a diagram 1502, there is a maximum number restriction for PDCCH BD under an SCS value. The restriction may be defined in, for example, the NR PHY layer specification. As shown in FIG. 15, if the PDCCH for the UE is transmitted within 15 KHz SCS, the maximum number of PDCCH candidates per slot per serving cell is 44.

Action #1. In the present implementation, in a PDCCH monitor occasion, the UE may monitor all search spaces in the CORESET #2 and the CORESET #3. According to the PDCCH-Config 1402 shown in FIG. 14, the number of PDCCH candidates of the search space #4, the search space #5, the search space #6 and the search space #7 are 18 (=6+6+4+2), 6 (=4+2), 18 (=6+6+4+2) and 6 (=4+2), respectively. Because the total number of PDCCH candidates of the TRPs (e.g., the TRP #1 and the TRP #2) exceeds the maximum number of PDCCH candidates as indicated in the diagram 1502, the UE may drop at least part of the PDCCH candidates in some implementations.

Action #2. In the present implementation, because the spatial information of the CORESET #2 is the CRI #0 and the spatial information of the CORESET #3 is the CRI #2, the UE may compare the most recent SINR measurement result of the CRI #0 with the most recent SINR measurement result of the CRI #2. If the SINR of the CRI #0 is better than the SINR of the CRI #2, the UE may monitor the PDCCH candidate of the CORESET #2 first. Hence, the UE may decode the PDCCH candidates of the search space #4 and the search space #5 first. Then, based on an original search space monitor rule, the UE may decode the search space #6 first because the search space #6 is a USS.

Case 7—PDCCH and PDSCH Multiplexing for Multi-TRP Transmission

Action #0. FIG. 16 is a schematic diagram illustrating a TRP mapping table contained in the TRP information, in accordance with example implementations of the present disclosure. As shown in FIG. 16, a TRP mapping table 1602 may contain two rows (e.g., Row1 and Row2) of TRP indices, which means two TRPs (e.g., a TRP #1 and a TRP #2) serve the UE in this slot. Meanwhile, the UE may be configured to monitor the PDCCH candidates in the CORESET #1 with the TCI state #3 which is directed to {CRI #2, QCL type A, CRI #2, QCL type D}.

Action #1a. In some implementations, if the UE is capable of applying different spatial domain filters at the same time (e.g., equipped with multiple RF modules for simultaneous transmission/reception function), and the UE receives the DCI which schedules the PDSCH on OFDM symbols #4 to #7, the UE may monitor the PDCCH candidates in the CORESET #1 on OFDM symbols #4 to #5 based on a PDCCH monitor occasion configuration. Because the TCI state indicated in the DCI for receiving the PDSCH is the TCI state #1, which is directed to {CRI #0, QCL type A, CRI #0, QCL type D}, the UE may know that the PDCCH and the PDSCH are transmitted from different TRPs. According to the UE's capability, the UE may receive the PDCCH and the PDSCH at the same time without dropping.

Action #1b. In some other implementations, if the UE is capable of applying only one spatial domain filter at a time, and the UE receives the DCI which schedules the PDSCH on OFDM symbols #4 to #7, the UE2 may monitor the PDCCH candidates in the CORESET #1 on OFDM symbols #4 to #5 based on the PDCCH monitor occasion configuration. Because the TCI state indicated in the DCI for PDCCH reception is TCI state #1, which is directed to {CRI #0, QCL type A, CRI #0, QCL type D}, the UE may know that the PDCCH and the PDSCH are transmitted from different TRPs. In the present implementation, the UE may not receive the PDCCH and the PDSCH at the same time due to the limitation of the UE's capability. If the UE performs initial access with the TRP #1, the UE may drop the PDCCH from the TRP #2 and receive only the PDSCH from the TRP #1 based on the TRP information in some implementations.

Figure 17:
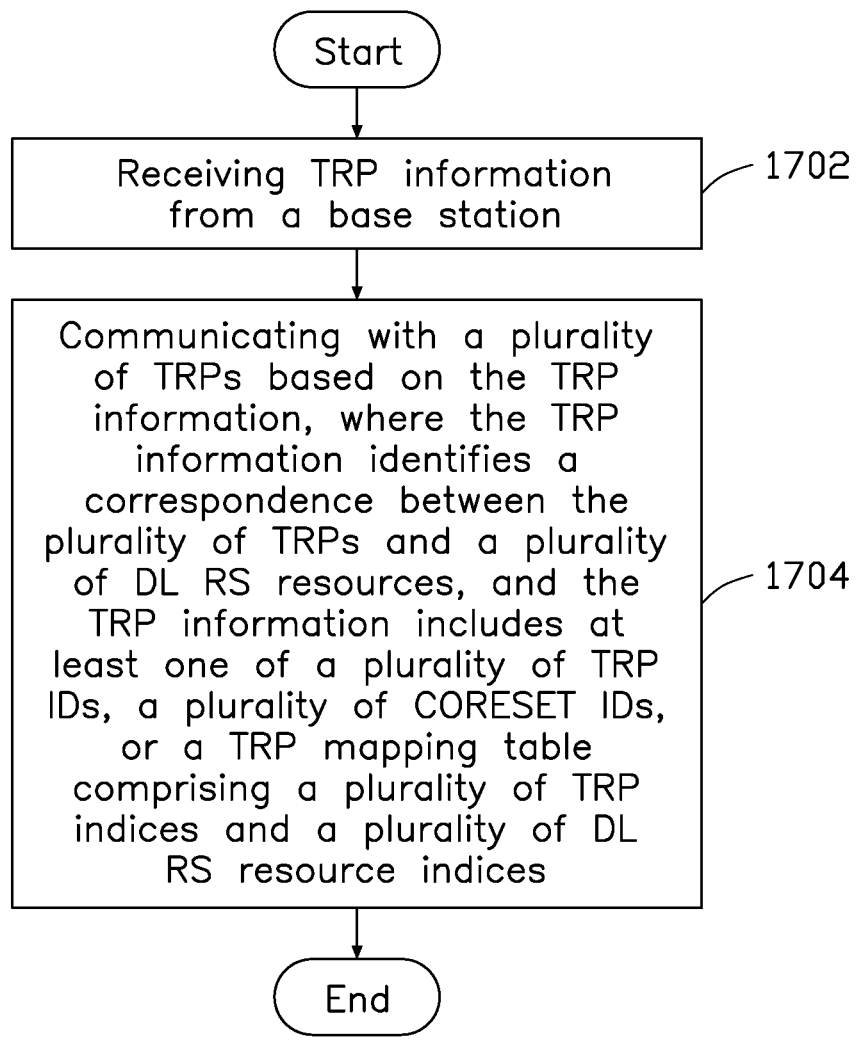
FIG. 17 is a flowchart for a method of multi-TRP transmission, in accordance with example implementations of the present disclosure.

FIG. 17 is a flowchart for a method of multi-TRP transmission, in accordance with example implementations of the present disclosure. As shown in FIG. 17, the flowchart includes actions 1702 and 1704.

In action 1702, the UE may receive the TRP information from the BS.

In action 1704, the UE may communicate with a plurality of TRPs based on the TRP information, where the TRP information may identify a correspondence between the plurality of TRPs and a plurality of DL RS resources. In some implementations, the TRP information may include at least one of the following items: a plurality of TRP IDs, a plurality of CORESET IDs, or a TRP mapping table including a plurality of TRP indices and a plurality of DL RS resource indices.

Figure 18:
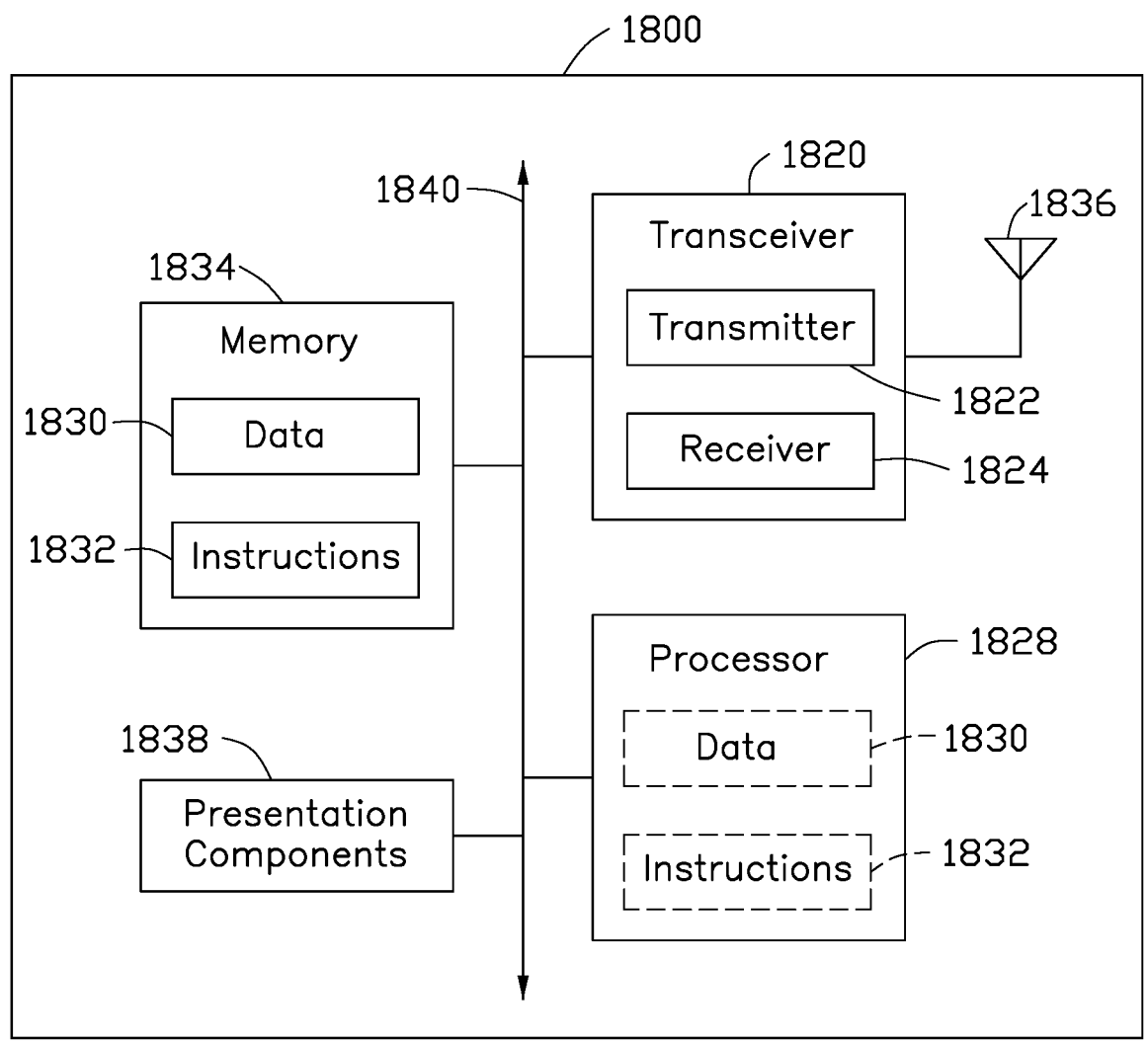
FIG. 18 is a block diagram illustrating a node for wireless communication, in accordance with various aspects of the present application.

FIG. 18 is a block diagram illustrating a node for wireless communication, in accordance with various aspects of the present application. As shown in FIG. 18, a node 1800 may include a transceiver 1820, a processor 1828, a memory 1834, one or more presentation components 1838, and at least one antenna 1836. The node 1800 may also include an RF spectrum band module, a BS communications module, a network communications module, and a system communications management module, Input/Output (I/O) ports, I/O components, and power supply (not explicitly shown in FIG. 18). Each of these components may be in communication with each other, directly or indirectly, over one or more buses 1840. In one implementation, the node 1800 may be a UE or a BS that performs various functions described herein, for example, with reference to FIGS. 1 through 17.

The transceiver 1820 having a transmitter 1822 (e.g., transmitting/transmission circuitry) and a receiver 1824 (e.g., receiving/reception circuitry) may be configured to transmit and/or receive time and/or frequency resource partitioning information. In some implementations, the transceiver 1820 may be configured to transmit in different types of subframes and slots including, but not limited to, usable, non-usable and flexibly usable subframes and slot formats. The transceiver 1820 may be configured to receive data and control channels.

The node 1800 may include a variety of computer-readable media. Computer-readable media can be any available media that can be accessed by the node 1800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1834 may include computer-storage media in the form of volatile and/or non-volatile memory. The memory 1834 may be removable, non-removable, or a combination thereof. Example memory includes solid-state memory, hard drives, optical-disc drives, and etc. As illustrated in FIG. 18, The memory 1834 may store computer-readable, computer-executable instructions 1832 (e.g., software codes) that are configured to, when executed, cause the processor 1828 to perform various functions described herein, for example, with reference to FIGS. 1 through 17. Alternatively, the instructions 1832 may not be directly executable by the processor 1828 but be configured to cause the node 1800 (e.g., when compiled and executed) to perform various functions described herein.

The processor 1828 (e.g., having processing circuitry) may include an intelligent hardware device, e.g., a Central Processing Unit (CPU), a microcontroller, an ASIC, and etc. The processor 1828 may include memory. The processor 1828 may process data 1830 and the instructions 1832 received from the memory 1834, and information through the transceiver 1820, the base band communications module, and/or the network communications module. The processor 1828 may also process information to be sent to the transceiver 1820 for transmission through the antenna 1836, to the network communications module for transmission to a core network.

One or more presentation components 1838 presents data indications to a person or other device. Example presentation components 1838 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE), the method comprising:
    receiving Transmission/Reception Point (TRP) information from a base station;
    communicating with a plurality of TRPs based on the TRP information;
    receiving Downlink Control Information (DCI) comprising a rate matching indicator indicating a particular one of a plurality of rate match pattern configurations contained in a Radio Resource Control (RRC) message;
    identifying a particular TRP transmitting the DCI based on the TRP information; and
    performing a rate matching procedure, based on the particular one of the plurality of rate match pattern configurations, to identify at least one radio resource unavailable for a Physical Downlink Shared Channel (PDSCH) on which a DL signal is transmitted by the particular TRP;
    wherein the TRP information identifies a correspondence between the plurality of TRPs and a plurality of Downlink (DL) Reference Signal (RS) resources;
    wherein the TRP information comprises at least one of:
    a plurality of TRP Identifiers (IDs);
    a plurality of Control Resource Set (CORESET) IDs; and
    a TRP mapping table comprising a plurality of TRP indices and a plurality of DL RS resource indices.

2. The method of claim 1, further comprising:
    receiving the DCI from the particular TRP, wherein the DCI further comprises a DL preemption indicator containing the TRP information;
    identifying the particular TRP associated with the DL preemption indicator based on the TRP information; and
    preempting a DL transmission from the particular TRP by another transmission.

3. The method of claim 1, further comprising:
    determining whether a total number of Physical Downlink Control Channel (PDCCH) candidates of the plurality of TRPs for Blind Decoding (BD), or a total number of Control Channel Elements (CCEs) of the plurality of TRPs for PDCCH estimation, exceeds a threshold; and
    dropping at least part of the PDCCH candidates, or at least part of the CCEs, when the total number of the PDCCH candidates for BD or the total number of the CCEs for PDCCH estimation exceeds the threshold.

4. The method of claim 3, wherein at least one dropped PDCCH candidate or at least one dropped CCE is determined based on an order of signal quality values of CORESETs of PDCCHs, or a type of a search space associated with the at least one dropped PDCCH candidate or the at least one dropped CCE.

5. The method of claim 3, wherein at least one dropped PDCCH candidate or at least one dropped CCE is transmitted from one of the plurality of TRPs.

6. The method of claim 1, further comprising:
    transmitting Uplink Control Information (UCI) comprising a Channel State Information (CSI) report to the base station;
    wherein the CSI report comprises a plurality of measurement results, and each of the plurality of measurement results comprises a CSI-RS Resource Indicator (CRI) and a measurement parameter set corresponding to the CRI.

7. The method of claim 6, wherein each of the measurement parameter set comprises at least one of a Precoding Matrix Indicator (PMI), a Channel Quality Indicator (CQI), a Rank Indication (RI), and a Layer Indication (LI).

8. The method of claim 1, further comprising:
    receiving a Medium Access Control (MAC) Control Element (CE) from the base station, the MAC CE comprising a plurality of spatial relation information indicators, more than one of the plurality of spatial relation information indicators activated for a Physical Uplink Control Channel (PUCCH) transmission; and
    performing the PUCCH transmission using at least one spatial filter that is determined from the activated more than one of the plurality of spatial relation information indicators.

9. The method of claim 8, further comprising:
    selecting at least one particular spatial relation information indicator from the activated more than one of the plurality of spatial relation information indicators, according to signal quality values of DL signals associated with the activated more than one of the plurality of spatial relation information indicators;
    wherein the at least one spatial filter used for the PUCCH transmission is associated with the at least one particular spatial relation information indicator.

10. The method of claim 9, wherein a number of the at least one particular spatial relation information indicator is greater than one when the UE supports a simultaneous transmission function.

11. A User Equipment (UE) comprising:
    one or more non-transitory computer-readable media having computer-executable instructions embodied thereon;
    at least one processor coupled to the one or more non-transitory computer-readable media, and configured to execute the computer-executable instructions to:
    receive Transmission/Reception Point (TRP) information from a base station;
    communicate with a plurality of TRPs based on the TRP information;
    receive Downlink Control Information (DCI) comprising a rate matching indicator indicating a particular one of a plurality of rate match pattern configurations contained in a Radio Resource Control (RRC) message;
    identify a particular TRP transmitting the DCI based on the TRP information; and perform a rate matching procedure, based on the particular rate match pattern configuration, to identify at least one radio resource unavailable for a Physical Downlink Shared Channel (PDSCH) on which a DL signal is transmitted by the particular TRP;

wherein the TRP information identifies a correspondence between the plurality of TRPs and a plurality of Downlink (DL) Reference Signal (RS) resources;

wherein the TRP information comprises at least one of:
a plurality of TRP Identifiers (IDs);
a plurality of Control Resource Set (CORESET) IDs; and
a TRP mapping table comprising a plurality of TRP indices and a plurality of DL RS resource indices.

12. The UE of claim 11, wherein the at least one processor is further configured to execute the computer-executable instructions to:
receive the DCI from the particular TRP, wherein the DCI further comprises a DL preemption indicator containing the TRP information;
identify the particular TRP associated with the DL preemption indicator based on the TRP information; and
preempt a DL transmission from the particular TRP by another transmission.

13. The UE of claim 11, wherein the at least one processor is further configured to execute the computer-executable instructions to:
determine whether a total number of Physical Downlink Control Channel (PDCCH) candidates of the plurality of TRPs for Blind Decoding (BD), or a total number of Control Channel Elements (CCEs) of the plurality of TRPs for PDCCH estimation, exceeds a threshold; and
drop at least part of the PDCCH candidates, or at least part of the CCEs, when the total number of the PDCCH candidates for BD or the total number of the CCEs for PDCCH estimation exceeds the threshold.

14. The UE of claim 13, wherein at least one dropped PDCCH candidate or at least one dropped CCE is determined based on an order of signal quality values of CORESETs of PDCCHs, or a type of a search space associated with the at least one dropped PDCCH candidate or the at least one dropped CCE.

15. The UE of claim 13, wherein at least one dropped PDCCH candidate or at least one dropped CCE is transmitted from one of the plurality of TRPs.

16. The UE of claim 11, wherein the at least one processor is further configured to execute the computer-executable instructions to:
transmit Uplink Control Information (UCI) comprising a Channel State Information (CSI) report to the base station;
wherein the CSI report comprises a plurality of measurement results, and each of the plurality of measurement results comprises a CSI-RS Resource Indicator (CRI) and a measurement parameter set corresponding to the CRI.

17. The UE of claim 16, wherein each measurement parameter set comprises at least one of a Precoding Matrix Indicator (PMI), a Channel Quality Indicator (CQI), a Rank Indication (RI), and a Layer Indication (LI).

18. The UE of claim 11, wherein the at least one processor is further configured to execute the computer-executable instructions to:
receive a Medium Access Control (MAC) Control Element (CE) from the base station, the MAC CE comprising a plurality of spatial relation information indicators, more than one of the plurality of spatial relation information indicators activated for a Physical Uplink Control Channel (PUCCH) transmission; and
perform the PUCCH transmission using at least one spatial filter that is determined from the activated more than one of the plurality of spatial relation information indicators.

19. The UE of claim 18, wherein the at least one processor is further configured to execute the computer-executable instructions to:
select at least one particular spatial relation information indicator from the activated more than one of the plurality of spatial relation information indicators, according to signal quality values of DL signals associated with the activated more than one of the plurality of spatial relation information indicators;
wherein the at least one spatial filter used for the PUCCH transmission is associated with the at least one particular spatial relation information indicator.

20. The UE of claim 19, wherein a number of the at least one particular spatial relation information indicator is greater than one when the UE supports a simultaneous transmission function.

* * * * *